US008499468B2

(12) United States Patent
Watanabe et al.

(10) Patent No.: US 8,499,468 B2
(45) Date of Patent: Aug. 6, 2013

(54) LENS SHAPE MEASUREMENT DEVICE

(75) Inventors: Takahiro Watanabe, Itabashi-ku (JP);
Kenichi Watanabe, Itabashi-ku (JP);
Kenji Miyashita, Itabashi-ku (JP);
Masahiro Jinbo, Shinjuku-ku (JP)

(73) Assignees: Kabushiki Kaisha Topcon, Tokyo (JP);
Hoya Corporation, Tokyo (JP)

( * ) Notice: Subject to any disclaimer, the term of this patent is extended or adjusted under 35 U.S.C. 154(b) by 439 days.

(21) Appl. No.: 12/809,180

(22) PCT Filed: Dec. 18, 2008

(86) PCT No.: PCT/JP2008/073046
§ 371 (c)(1),
(2), (4) Date: Jan. 6, 2011

(87) PCT Pub. No.: WO2009/078457
PCT Pub. Date: Jun. 25, 2009

(65) Prior Publication Data
US 2011/0216327 A1 Sep. 8, 2011

(30) Foreign Application Priority Data
Dec. 19, 2007 (JP) .................................. 2007-326787

(51) Int. Cl.
*G01B 1/00* (2006.01)
(52) U.S. Cl.
USPC .................................. 33/507; 33/28; 33/200
(58) Field of Classification Search
USPC ............................................ 33/507, 28, 200
See application file for complete search history.

(56) References Cited

U.S. PATENT DOCUMENTS

| 5,121,550 | A | | 6/1992 | Wood et al. | |
|---|---|---|---|---|---|
| 5,465,495 | A | * | 11/1995 | Takubo | 33/507 |
| 5,501,017 | A | * | 3/1996 | Suzuki | 33/200 |
| 5,502,519 | A | * | 3/1996 | Hosoi | 33/200 |
| 5,594,992 | A | * | 1/1997 | Suzuki et al. | 33/200 |
| 5,959,199 | A | * | 9/1999 | Suzuki et al. | 33/507 |
| 6,006,592 | A | | 12/1999 | Suzuki et al. | |
| 6,163,967 | A | * | 12/2000 | Suzuki et al. | 33/200 |
| 6,170,321 | B1 | * | 1/2001 | Suzuki et al. | 33/507 |
| 6,263,583 | B1 | * | 7/2001 | Mizuno | 33/28 |
| 6,328,630 | B1 | * | 12/2001 | Jinbo et al. | 451/11 |
| 6,427,350 | B1 | * | 8/2002 | Asaoka et al. | 33/507 |
| 6,625,893 | B2 | * | 9/2003 | Suzuki et al. | 33/200 |
| 6,742,272 | B2 | * | 6/2004 | Eto et al. | 33/507 |

(Continued)

FOREIGN PATENT DOCUMENTS

| DE | 41 39 712 | 6/1992 |
|---|---|---|
| DE | 697 13 992 | 4/2003 |
| EP | 0 844 047 | 5/1998 |
| ES | 2 257 978 | 5/2007 |
| FR | 2 669 999 | 12/1991 |
| GB | 2 251 945 | 7/1992 |
| JP | 62-137510 | 6/1987 |
| JP | 4-332808 | 11/1992 |
| JP | 8-294855 | 11/1996 |
| JP | 10-217086 | 8/1998 |
| JP | 10-328992 | 12/1998 |
| JP | 2001-166269 | 6/2001 |
| JP | 2005-275190 | 10/2005 |

OTHER PUBLICATIONS

International Search Report issued Mar. 10, 2009 in International (PCT) Application No. PCT/JP2008/073046.

*Primary Examiner* — Yaritza Guadalupe-McCall
(74) *Attorney, Agent, or Firm* — Wenderoth, Lind & Ponack, L.L.P.

(57) ABSTRACT

A relationship between a rim shape and a position of a mounting hole is obtained based on a detection signal from the second position detector (40) by controlling a measuring element shifter (6) to move the leading end of a measuring element for a lens (36) to have contact with an refracting face of the lens (Lm) held in the lens holder.

10 Claims, 34 Drawing Sheets

(56) References Cited

U.S. PATENT DOCUMENTS

| | | | |
|---|---|---|---|
| 7,069,107 B2* | 6/2006 | Ueno | 33/200 |
| 7,441,895 B2* | 10/2008 | Akiyama et al. | 351/206 |
| 7,500,315 B2* | 3/2009 | Takeichi | 33/28 |
| 7,895,758 B2* | 3/2011 | Watanabe | 33/200 |
| 8,042,280 B2* | 10/2011 | Watanabe et al. | 33/507 |
| 2002/0026722 A1* | 3/2002 | Suzuki et al. | 33/200 |
| 2002/0104226 A1* | 8/2002 | Eto et al. | 33/507 |
| 2003/0182813 A1* | 10/2003 | Suzuki et al. | 33/200 |
| 2005/0251280 A1* | 11/2005 | Shibata | 33/200 |
| 2007/0118428 A1* | 5/2007 | Akiyama et al. | 705/26 |
| 2009/0007444 A1* | 1/2009 | Shibata | 33/200 |
| 2009/0282688 A1* | 11/2009 | Watanabe | 33/200 |
| 2010/0064533 A1* | 3/2010 | Miyashita | 33/200 |
| 2011/0146093 A1* | 6/2011 | Watanabe et al. | 33/507 |
| 2011/0216327 A1* | 9/2011 | Watanabe et al. | 356/601 |

* cited by examiner

LENS SHAPE MEASUREMENT DEVICE

TECHNICAL FIELD

The present invention relates to a lens shape measurement device which measures a lens shape of eyeglasses.

BACKGROUND ART

In general, as eyeglass frames, a rim frame (full rim), a two-point frame (rimless frame), a grooved frame (half-rim and Nylor) and the like are known.

As a two-point frame in theses eyeglass frames, a two-point frame disclosed in JP 2005-275190A is known. As this two-point frame, two-point frame eyeglasses 100 illustrated in FIGS. 30A, 30B, for example, are known. In this two-point frame eyeglasses 100, a bridge (an attachment for a two-point frame) 101 is arranged between nose sides of right and left eyeglass lenses ML, MR, the bridge 101 is fastened to the eyeglass lenses ML, MR by fastening screws 103, 104, and attachments 105, 106 (attachments for a two-point frame) for attaching temples 109, 110 are fastened by fastening screws 107, 108 on ear sides of the eyeglass lenses ML, MR. In addition, the temples 109, 110 are attached to the attachments 105, 106.

In order to fasten the attachment 106 to the right side eyeglass lens MR by the fastening screw 108 as illustrated in FIG. 30C, it is necessary to form an attachment hole 109 on the eyeglass lens MR as illustrated in FIG. 30D. Moreover, in order to fasten the bridge 101 on the nose side of the eyeglass lens MR by the fastening screw 104, it is necessary to form an attachment hole 110 as illustrated in FIG. 30E.

The attachment 106 for fitting a temple includes a side plate portion 106a which has contact with an ear side portion of the circumferential face of the eyeglass lens MR and a fastening plate portion 106b which has contact with an ear side portion of a rim portion of a front side refracting face fr of the eyeglass lens MR. An angle between the side plate portion 106a and the fastening plate portion 106b of the attachment 106 is set to α.

Meanwhile, when manufacturing the above-described two-point frame eyeglasses 100, it is general for a person wearing eyeglasses to measure refracting power and check a visual performance of eyes and also to select an eyeglass frame in an eyeglass shop. In an eyeglass shop, it is general to display eyeglasses in which a lens such as a demo-lens (dummy lens) is fitted in a frame.

Even in two-point frame eyeglasses, the above attachment 101, 105, 106 and the like are fitted in a demo-lens (dummy lens). Moreover, the position of the mounting hole 109 into which the attachment 106 is fitted is the same as the position in actual eyeglasses. For this reason, it is necessary to measure the position of the attachment hole 109 into which the attachment 106 is fitted. This is the same as the bridge 101, the attachment 105 and the like.

As a method of measuring a position of such a mounting hole 109, a method of obtaining a shape of a lens and a mounting hole from output of a light receiving element by projecting parallel illumination light flux from one face of a lens and receiving the light flux which has transmitted the lens and the light flux around that by the light receiving element as described in Spanish Patent Application No. 2006-00589.

However, the mounting hole is formed to be inclined to a lens. For this reason, the projection positions to the light-receiving element of the opening of both ends of the mounting hole are overlapped out of alignment, and the inside opening of the mounting hole and the opening on the side into which the illumination light enters are reflected by the lens to be projected on the light-receiving element; thus, the position of the mounting hole can not be accurately measured.

It is, therefore, an object of the present invention to provide a lens shape measuring device which can easily and accurately measure a position of a mounting hole for fitting an attachment of a two-point frame into a lens.

DISCLOSURE OF THE INVENTION

In order to achieve the above object, a lens shape measurement device according to the embodiment of the present invention includes a lens holder set in a measuring element main body, a measuring element for a lens configured to measure a rim shape of a lens, the measuring element for a lens having a leading end portion engageable with a mounting hole of the lens for an attachment, which is held in the lens holder, and a side face which has contact with a circumferential face of the lens to be moved therealong, a measurement element shifter configured to displace the measuring element for a lens along an outer circumferential face of the lens, a first position detector configured to detect a position of the measuring element for a lens along the outer circumferential face, a second position detector configured to detect a position in the direction orthogonal to the first position detector, and an arithmetic control circuit configured to obtain a relationship between the rim shape and a position of the mounting hole based on a detection signal from the second position detector by controlling the measuring element shifter to move the leading end of the measuring element for a lens to have contact with an refracting face of the lens held in the lens holder.

According to the present invention, a position of a mounting hole of a lens into which an attachment of a two-point frame can be easily and accurately measured.

BEST MODE FOR CARRYING OUT THE INVENTION

Hereinafter, an embodiment of the present invention will be described with reference to the drawings.

[Configuration]

Figure 1:
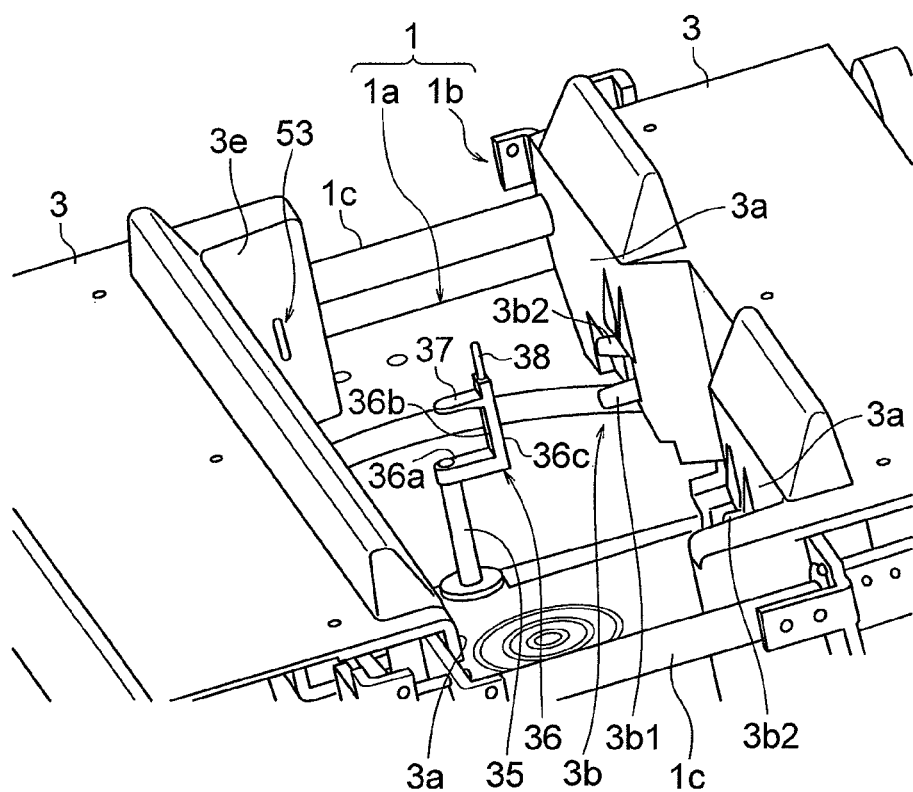
FIG. 1 is a partially schematic perspective view illustrating a lens shape measurement device according to the present invention.

A lens shape measurement device according to the present invention is used for measuring a shape of a lens such as a template, a demo-lens or a lens frame. In this case, a distance (diameter) from a geometric center of a lens to a circumferential face of a lens is changed in a plurality of positions in the circumferential direction of the lens, so that a diameter in which this distance is changed can be a moving radius. FIG. 1 illustrates a lens shape measurement device which measures this moving radius. The lens shape measurement device includes a measurement device main body 1.

This measurement device main body 1 includes in a lower portion thereof a case portion 1a for housing the measurement mechanism and a lens frame holding mechanism 1b provided above the case portion 1a. The case portion 1a in FIG. 1 includes inside thereof a bottom portion provided with a base 2 illustrated in FIG. 2.

The lens frame retaining mechanism 1b includes a pair of parallel guide rods (guide members) 1c, 1c fastened to the case portion. Slide frames 3, 3 are retained by the guide members 1c, 1c, which can relatively move closer and move away. These slide frames 3, 3 are biased by a coil spring and the like in the direction where they come close to each other. These slide frames 3, 3 include facing longitudinal walls 3a, 3a with which a lens frame (not shown) of eyeglasses has contact. The slide frames 3, 3 include a lens frame holder 3b which holds a lens frame as a lens frame holding unit. This lens frame holder 3b includes a lower side holding bar 3b1 which projects from the longitudinal wall 3a and an upper side holding bar 3b2 which is attached to the slide frame 3 in an openable and closable manner with respect to the holding bar 3b1 from the upper side. The lens frame holder 3b is attached to each of right and left lens frames of not shown eyeglasses. In addition, as the lens frame holding mechanism 1b, a configuration disclosed in JP H10-328992A, for example, or other known arts can be adopted. Thus, the detailed description of the lens frame holding mechanism 1b is omitted.

[Measurement Mechanism]

A measurement mechanism 1d illustrated in FIGS. 2-5 is installed on the base 2. This measurement mechanism 1d includes a base supporting member 4 fastened on the base 2.

Figure 5:
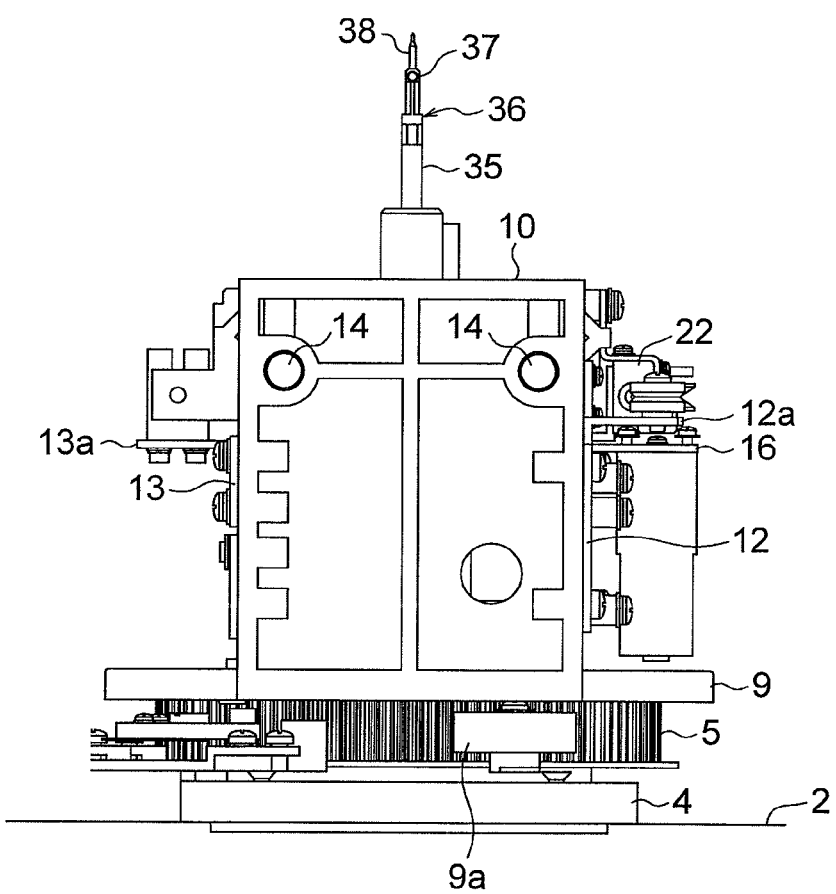
FIG. 5 is a right side view of the measurement mechanism in FIG. 4.
Figure 5A:
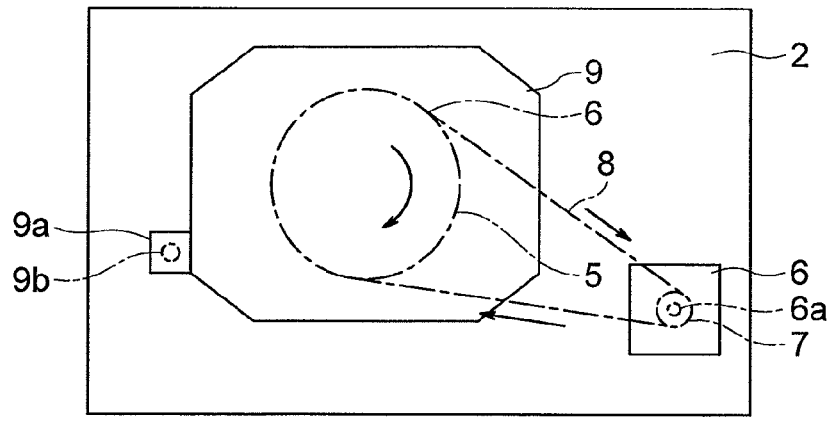
FIG. 5A is a pattern diagram illustrating a driver of a rotation base of the measurement mechanism in FIG. 2.

This base supporting member 4 includes a large diameter driven gear 5 to be horizontally rotatable about a vertical axis. The base 2 includes a driving motor 6 schematically illustrated in FIG. 5A adjacent to the driven gear (timing gear) 5. This driving motor 6 includes an output shaft 6a. A pinion (timing gear) 7 is fastened to the output shaft 6a. A timing belt 8 is stretched over the pinion 7 and the driven gear 5.

Upon the driving of the driving motor 6, the rotation of the output shaft 6a of the driving motor 6 is transferred to the driven gear 5 via the pinion 7 and the timing belt 8, and the driven gear 5 rotates. In addition, the driving motor 6 is a biphasic stepping motor.

As illustrated in FIGS. 2-5, a rotation base 9 is integrally fastened on the driven gear 5. This rotation base 9 includes a photosensor 9a as an origin detector i.e., an origin detection unit. In this case, for example, a light emitter 9b for indicating an origin position is placed on the base 2 as a light emitting unit. A linear or point-like light flux is irradiated from the light emitter 9b upwardly as an origin mark, and if the photosensor 9a detects the light flux as an origin mark, the origin position of the horizontal rotation of the rotation base 9 can be obtained. The origin detector includes the photosensor 9a and the light emitter 9b. As an origin detector, known arts such as a transparent photosensor, a refracting type photosensor or an adjacent photosensor can be adopted.

Figure 2:
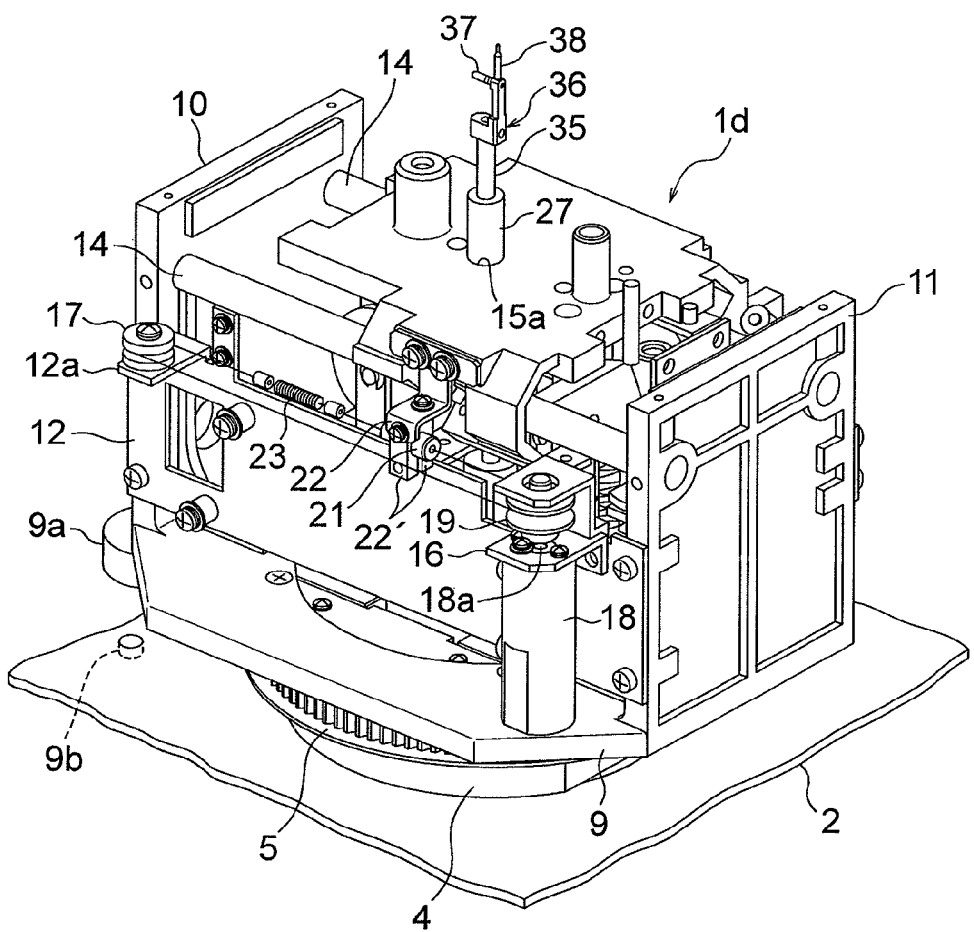
FIG. 2 is a perspective view illustrating a measurement mechanism of the lens shape measurement device in FIG. 1.
Figure 3:
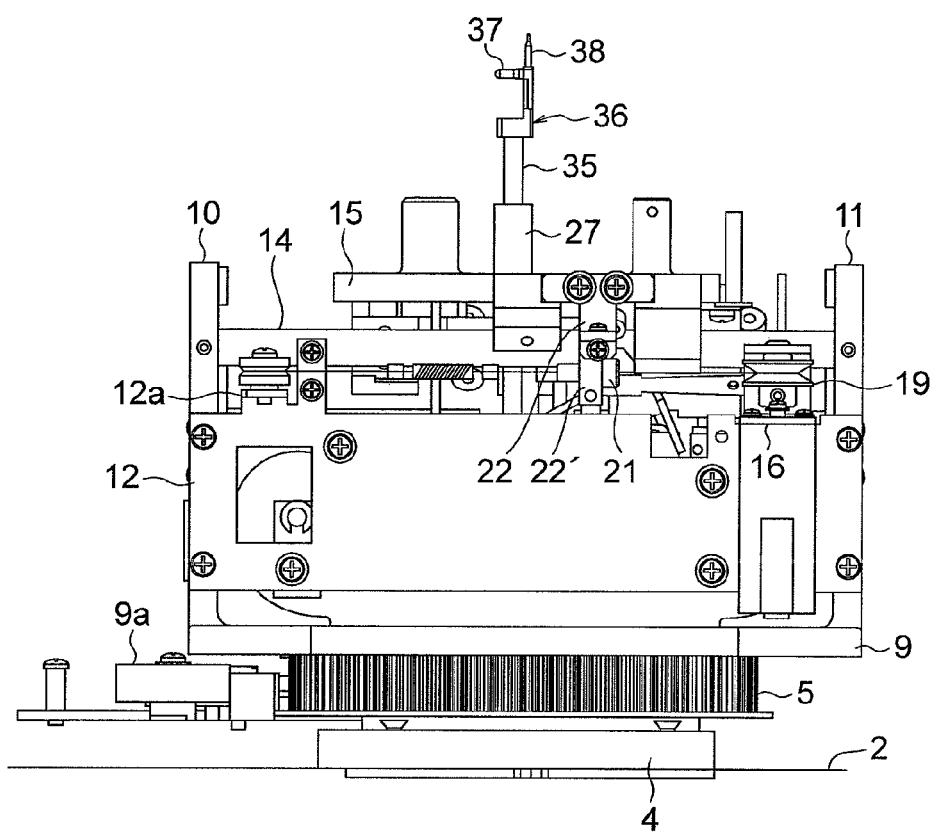
FIG. 3 is a front view of the measurement mechanism in FIG. 2.
Figure 4:
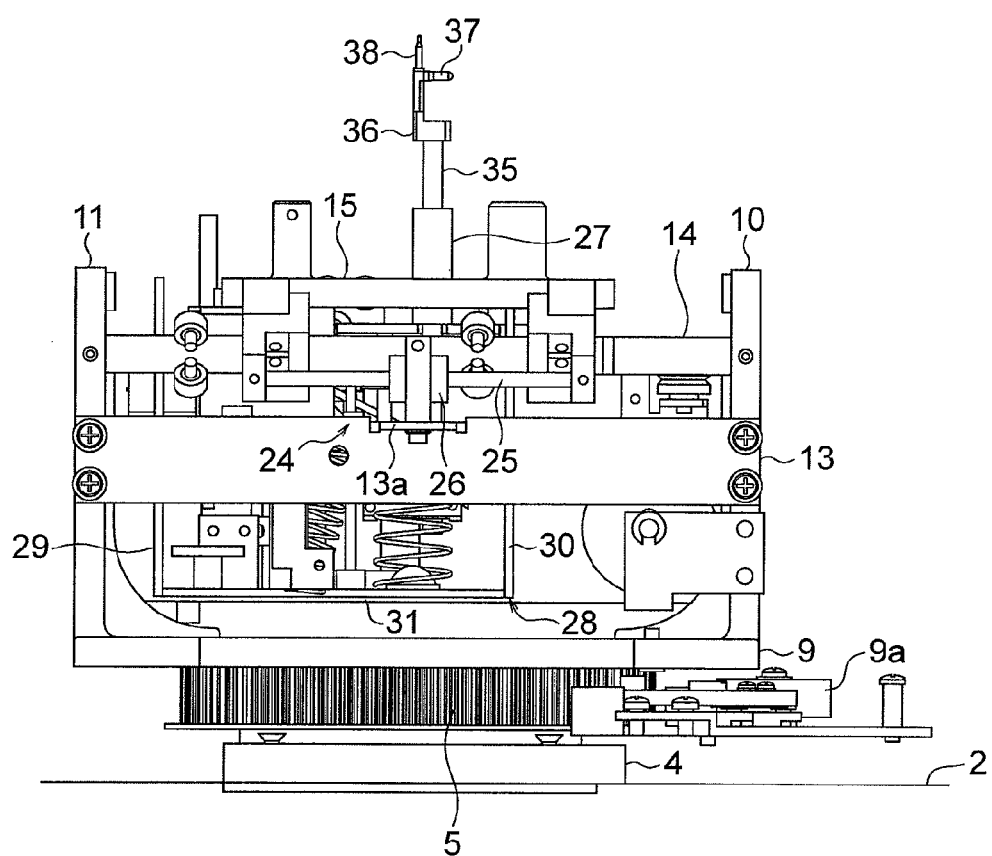
FIG. 4 is a back view of the measurement mechanism in FIG. 2.

Facing parallel rail attachment plates 10, 11 each of which extends upwardly illustrated in FIGS. 2-4 are integrally fastened to both of the end portions of the rotation base 9 in the longitudinal direction. As illustrated in FIG. 3, end portions of a side plate 12 in the longitudinal direction are fastened to one side portion of the rail attachment plate 10 and one side portion of the rail attachment plate 11. As illustrated in FIG. 4, end portions of a side plate 13 in the longitudinal direction are fastened to the other side portion of the rail attachment plate 10 and the other side portion of the rail attachment plate 11.

As illustrated in FIGS. 2-4, a pair of parallel shaft-like guide rails 14, 14 are horizontally arranged between the upper portions of the facing rail attachment plates 10, 11. Both of the end portions of each guide rail 14 are fastened to the rail attachment plates 10, 11, and a slider 15 is retained by the guide rails 14, 14 to be movable in the longitudinal direction.

Moreover, as illustrated in FIGS. 2, 3, a pulley supportting plate portion 12a which horizontally projects towards the side is integrally formed with the side plate 12 adjacent to the rail attachment plate 10 by bending, and a bracket 16 for attaching a motor is fastened to the side plate 12 adjacent to the rail attachment plate 11.

Figure 5B:
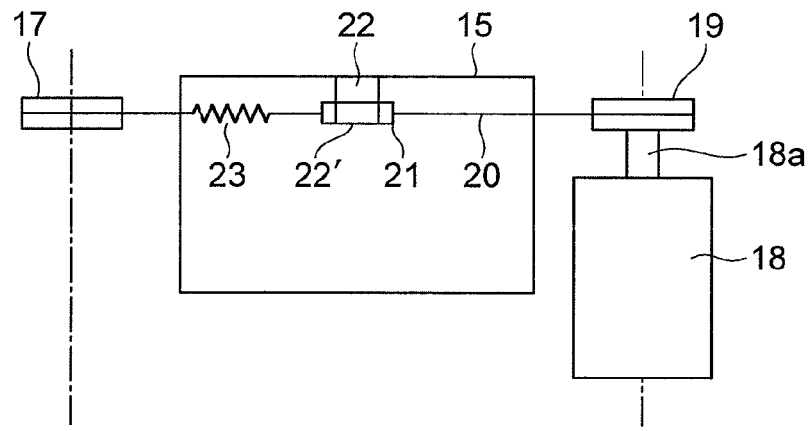
FIG. 5B is a pattern diagram describing a slider driving mechanism in FIG. 2
Figure 5C:
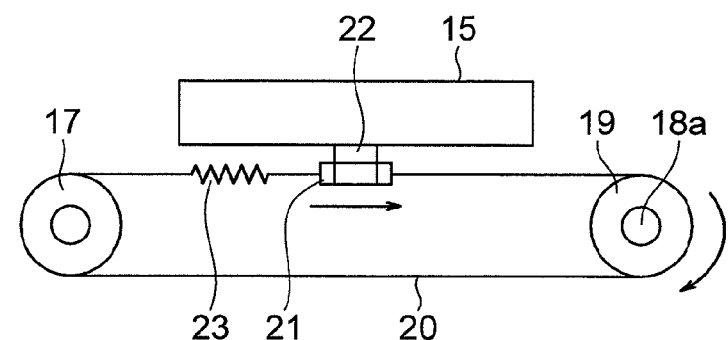
FIG. 5C is a plan view of FIG. 5B.

A driven pulley 17 is attached to the pulley supporting plate portion 12a to be horizontally rotatable about an axis line extending up and down. An upper end portion of a driving motor 18 for moving a slider is fastened to the bracket 16. A DC motor is used for this driving motor 18. The axis line of the output shaft 18a of the driving motor 18 is vertically directed, and a driving pulley 19 is attached to the output shaft 18a as illustrated in FIGS. 5B, 5C.

A circular wire 20 is stretched over the pulleys 17, 19. A portion adjacent to one end portion of the wire 20 is held by a shaft-like wire holding member 21. This wire holding member 21 is fastened to the slider 15 via bracket 22, 22'. Both of the end portions of the wire 20 are connected via a coil spring 23. Thereby, upon the normal rotation or the reverse rotation of the driving motor 18, the output shaft 18a and the driving pulley 19 normally rotate or reversely rotate, so that the slider 15 is displaced right or left in FIG. 3.

Figure 5D:
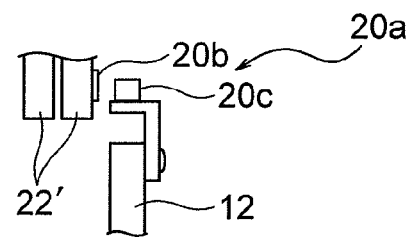
FIG. 5D is a schematic view describing an origin detector of the slider in FIG. 2.

As illustrated in FIG. 5D, an origin sensor 20a which detects an origin of a displaced position (displacement) of the slider 15 is arranged between the bracket 22' and the side plate 12 as an origin detection unit, i.e., an origin detector. A reflection type sensor is used for this origin sensor 20a. This sensor includes a reflection plate 20b having a slit-like reflection face (not shown) extending up and down, and a reflection type photosensor 20c having a light emitting element and a light receiving element. The refection plate 20b is set in the bracket 22' and the photosensor 20c is set in the side plate 12.

As the origin sensor 20a, a known technique such as a transparent photosensor and a proximity photosensor can be adapted.

A supporting plate portion 13a which horizontally projects to the side as illustrated in FIG. 4 is integrally formed in the central portion of the side plate 13 in FIG. 4 in the longitudinal direction by bending. A linear scale 24 which detects the displaced position of the slider 15 of the horizontal direction in the extending direction of the guide rail 14 is arranged between the side plate 13 and the slider 15 as illustrated in FIG. 4. This linear scale 24 functions as a position detector (position detection unit) which is used when detecting a plurality of positions in the circumferential direction of the circumferential face of the lens, i.e., a moving radius detection sensor (moving radius detector) for use when detecting a moving radius of a lens This linear scale 24 includes a shaft-like main scale 25 held by the slider 15 parallel to the guide rail 14 and a detection head 26 which is fastened to the supporting plate portion 13a and reads the positional information of the main scale 25. This detection head 26 detects the displaced position of the slider 15 in the horizontal direction from the information for detecting the position of the main scale 25. For example, a known magnetic scale or optical scale can be used for this linear scale 24.

For instance, in a magnetic scale, a magnetic pattern S, N is alternately provided at minute intervals as information for detecting a position (information for detecting displacement) in the axis line direction of the main scale 25, and the magnetic pattern is detected by a detection head (a head for detecting a magnetic change) 26, so that the displacement (displaced position) of the slider 15 can be detected. Meanwhile, in an optical scale, the main scale 25 is formed in a plate-like form and fine interval slits are provided in the longitudinal direction of the main scale 25, and a light emitting element and a light receiving element are placed to sandwich the main scale 25 and the light from the light emitting element is detected by the light receiving element via the slits of the main scale 25, so that the displacement (displaced position) of the slider 15 can be detected by obtaining the number of slits.

The slider 15 includes in the substantial center thereof a through hole 15a as illustrated in FIG. 2. A guide tube 27 extending vertically is inserted into the thorough hole 15a. A supporting frame 28 is arranged on the lower side of the slider 15 as illustrated in FIG. 4. This supporting frame 28 includes longitudinal frames 29, 30 each having an upper end portion retained by the slider 15 and a transverse board (bottom plate) 31 fastened to the lower end portions of the longitudinal frames 29, 30.

Figure 8:
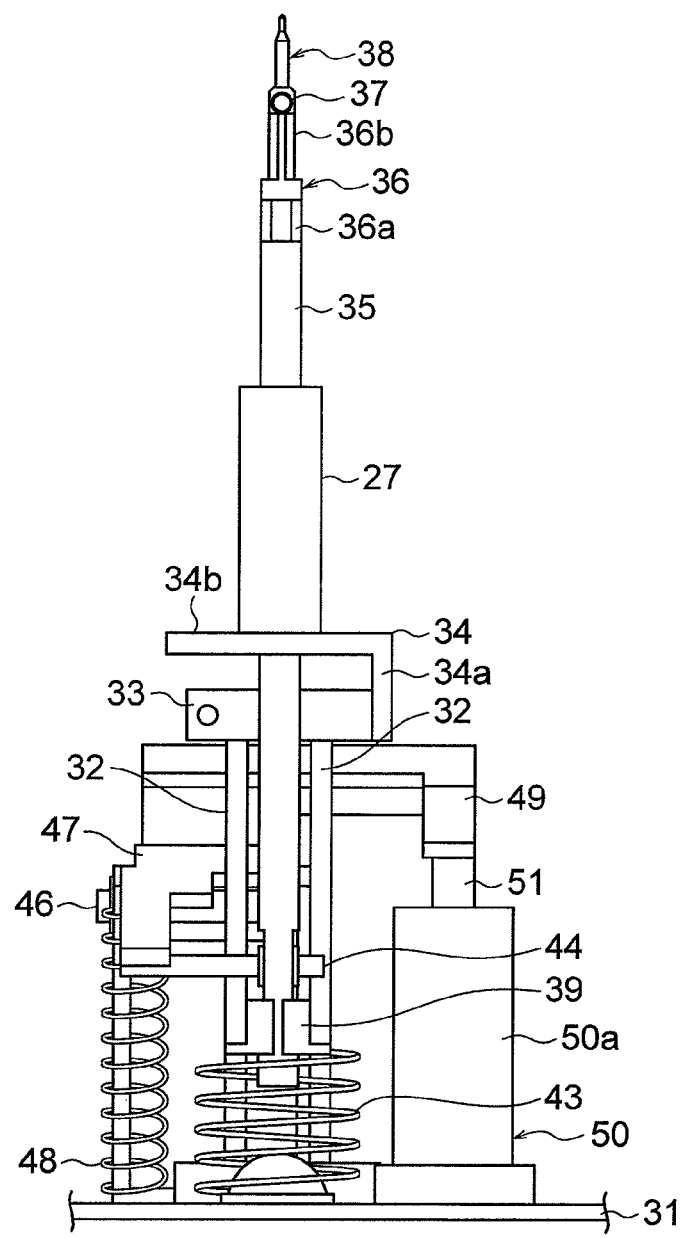
FIG. 8 is a left side view of FIG. 7.

Lower end portions of a pair of parallel shaft-like supporting members 32, 32 extending up and down are fastened to the transverse plate (bottom plate) 31 (refer to FIG. 8). A holding member (connection member) 33 is fastened to the upper end portions of the supporting members 32, 32, and a longitudinal wall 34a of a guide supporting member 34 having a L-shaped side face is fastened to the holding member 33. The lower end portion of the guide tube 27 is fastened on a transverse wall (upper wall) 34b of the guide supporting member 34.

A measuring element shaft 35 extending vertically is fitted into the guide tube 27 in a vertically movable manner, and a measuring element for a lens (a measuring element for a rim shape of a lens) 36 is integrally set in the upper end portion of the measuring element shaft 35. This measuring element for a lens 36 includes an L-shape having an attachment portion 36a vertically arranged in the upper end portion of the measuring element shaft 35 and a vertical portion 36b extending upward from the attachment portion 36a. A back face 36c of the vertical portion 36b is processed at a certain R. A measuring element for a lens frame 37 is integrally set in the upper end portion of the vertical portion 36b parallel to the attachment portion 36a.

Figure 9:
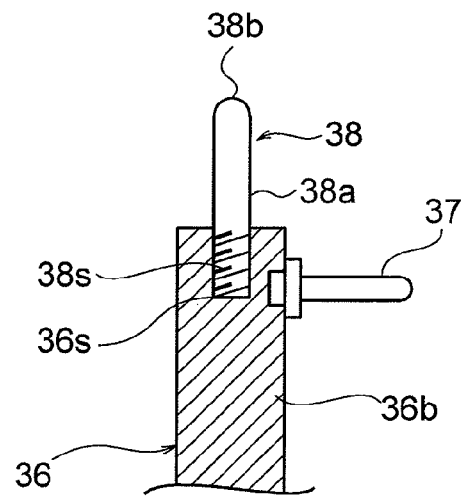
FIG. 9 is a partially schematic perspective view illustrating a measuring element for a lens illustrated in FIG. 1.
Figure 10:
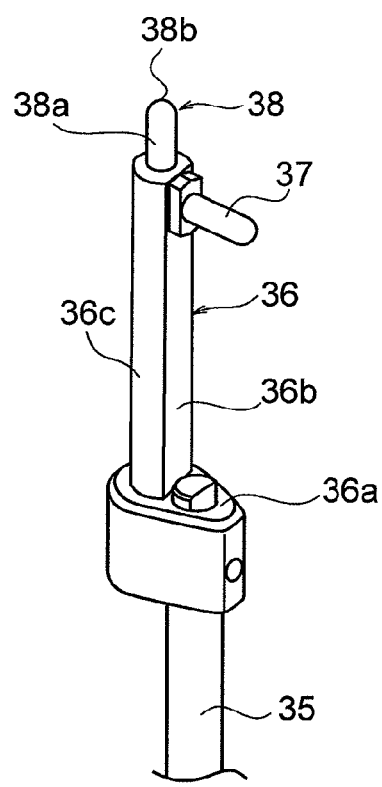
FIG. 10 is a side view of FIG. 9.

A measuring element 38 for a mounting hole which projects upwardly is integrally set in the upper end of the measuring element for a lens 36 as illustrated in FIG. 10. This measuring element for a mounting hole 38 includes a shaft portion 38a attached on the upper end of the vertical portion 36b of the measuring element for a lens 36 parallel to the axis line of the measuring element shaft 35 and a hemisphere shape 38b arranged on the upper end portion of the shaft portion 38a. It is desirable for the hemisphere shape 38b to be larger than a diameter of a general mounting hole (2.2φ), in order to correspond to various diameters of mounting holes. In addition, it is not necessary for the measuring element for a mounting hole 38 to be integral with the measuring element for a lens 36. For example, a screw portion 38s can be provided in the measuring element for a mounting hole 38 as illustrated in FIG. 9, and the measuring element for a mounting hole 38 can be detachably attached to the upper end portion of the vertical portion 36b by screwing the screw portion 38s into the screw hole 36s of the upper end portion of the vertical portion 36b.

A step face 38d as a corner measurement portion is arranged on the upper end of the measuring element attachment member 36 in the outer circumference of the base portion of the shaft-like measurement portion 38a. The edge corner of the lens Lm has contact with the corner between the shaft-like measurement portion 38a and the step face 38d when measuring the shape of the lens Lm by the measuring element for a lens.

Figure 6:
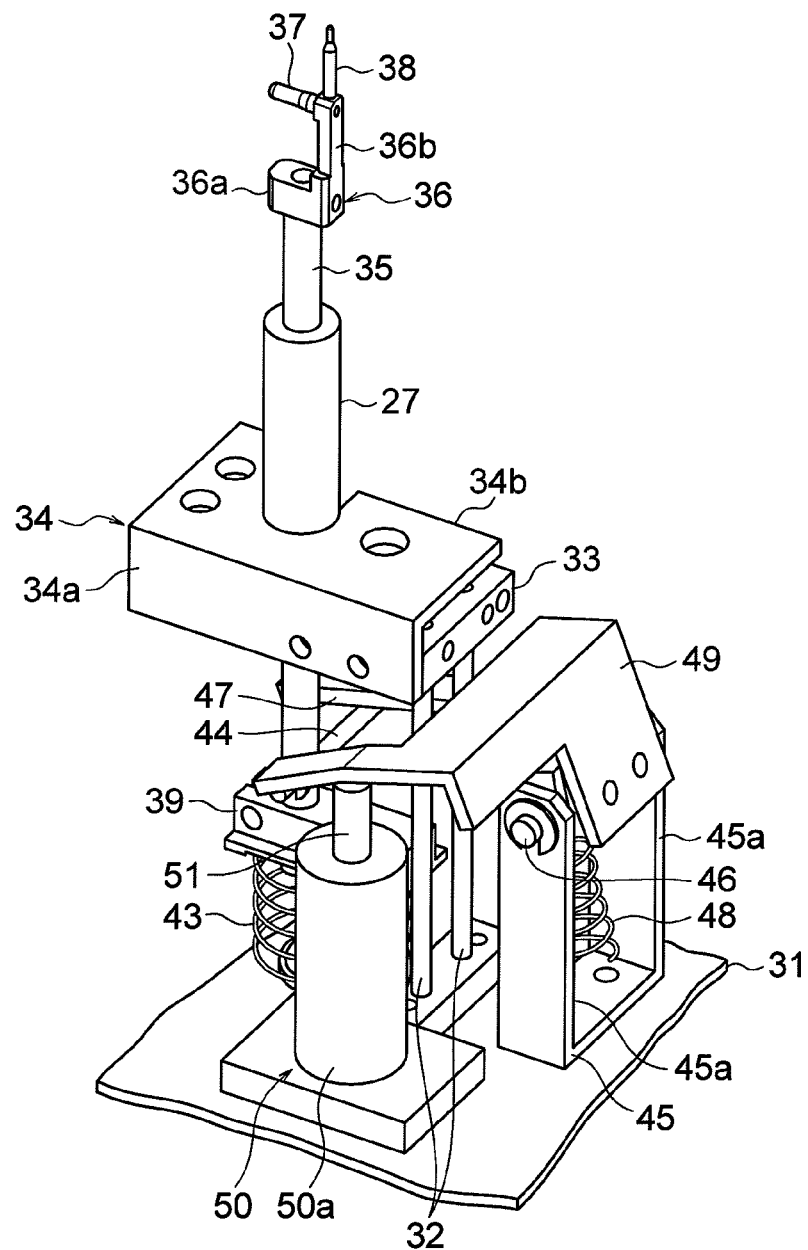
FIG. 6 is a perspective view illustrating a moving-up-and-down mechanism of a measuring element in FIG. 2.
Figure 7:
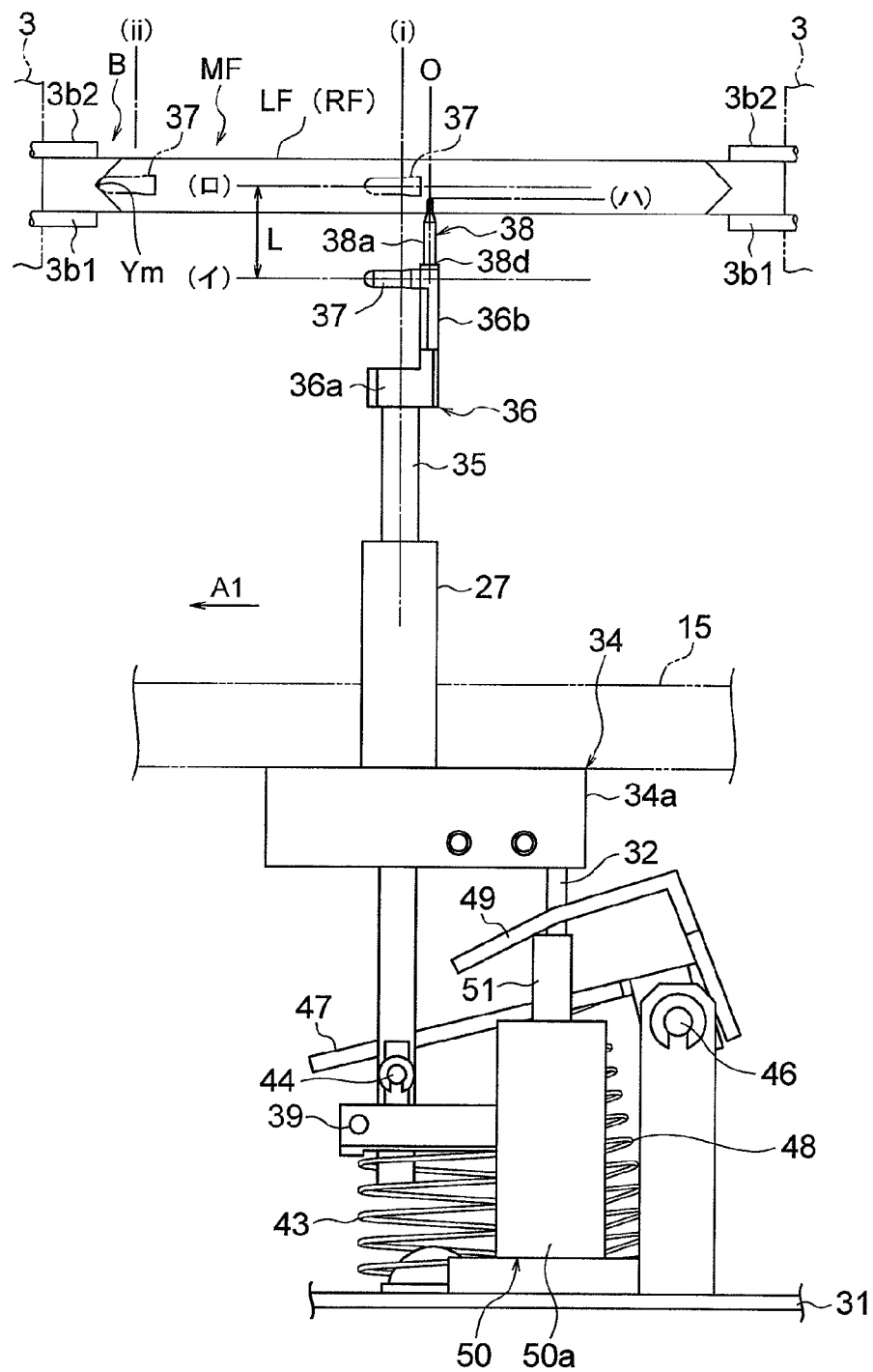
FIG. 7 is a view describing measurement of a lens frame by the moving-up-and-down mechanism in FIG. 6.
Figure 13:
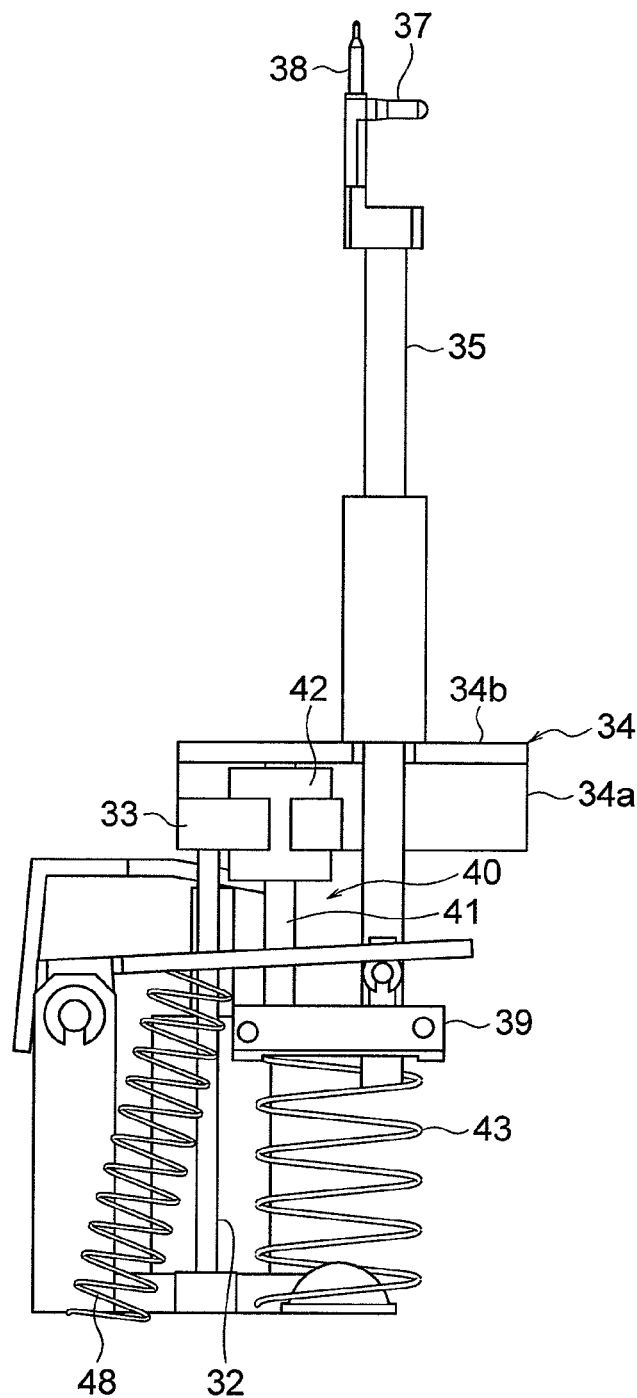
FIG. 13 is a view describing a linear scale of the moving-up-and-down mechanism in FIG. 11.
Figure 14:
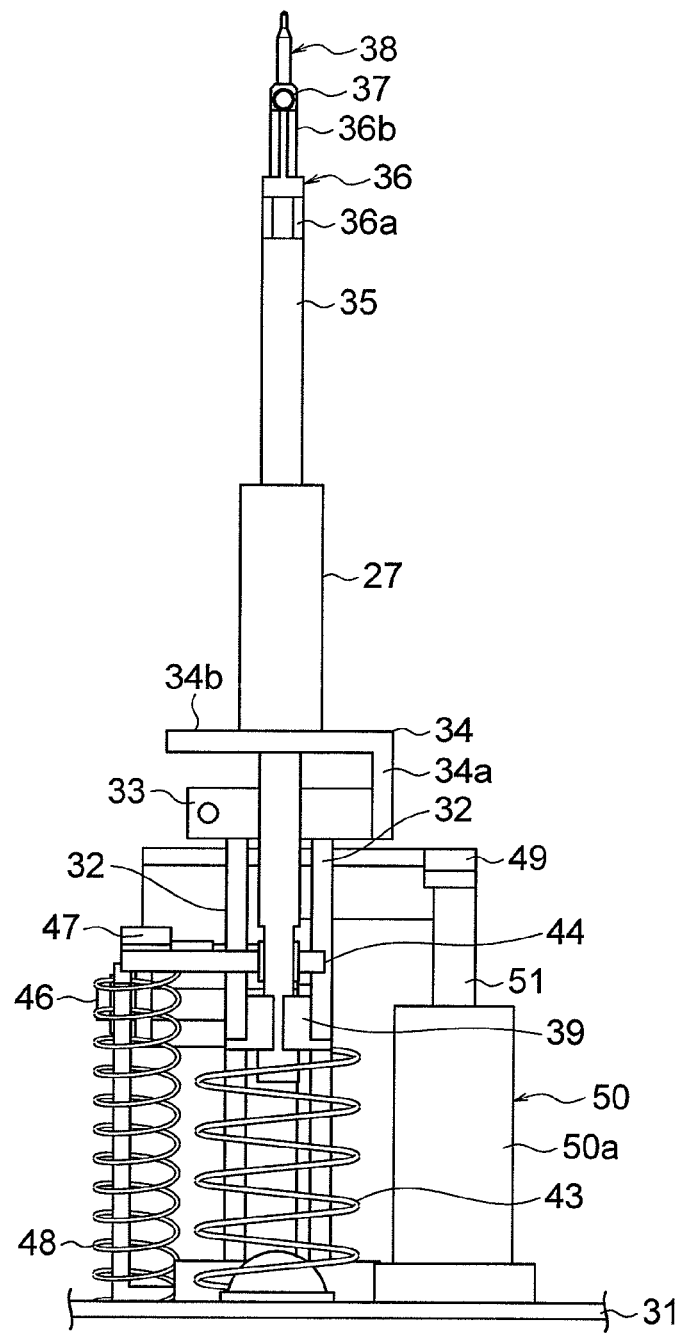
FIG. 14 is a right side view of FIG. 13.

As illustrated in FIGS. 6-8, a bracket 39 is fastened to the lower end portion of the measuring element shaft 35. Moreover, as illustrated in FIG. 13, a linear scale 40 which detects a displaced position in the vertical direction is placed between the bracket 39 and the guide supporting member 34 as a position detector (position detection unit) in the vertical direction, i.e., a height detection sensor (a height detector of a height detection unit).

This linear scale 40 includes a shaft-like main scale 41 placed in parallel with the measuring element shaft 35 toward up and down and a detection head 42 which detects displaced positions of the measuring elements 37, 38 in the vertical direction from the displacement of the main scale 41 in the vertical direction. The main scale 41 has the upper end portion fastened to the holding member 33 and the lower end portion fastened (held) to the bracket 39. The detection head 42 is held by the holding member 33. For this linear scale 40, a magnetic scale or an optical scale can be adopted similar to the above-described linear scale 24.

As illustrated in FIGS. 6-8, a coil spring 43 which biases the measuring element shaft 35 upwardly is arranged between the bracket 39 and the transverse plate (bottom plate) 31. An engagement shaft 44 which is located above the bracket 39 and is orthogonal to the measuring element shaft 35 is attached in the vicinity of the lower end portion of the measuring element shaft 35. A bracket 45 formed into a U-shape as illustrated in FIG. 6 is fastened on the transverse plate (bottom plate) 31. Both end portions of a supporting shaft 46 is held by facing walls 45a, 45a of the bracket 45 in a rotatable manner about an axis line, and a pressure lever 47 is fastened to the supporting shaft 46. This pressure lever 47 has contact with the upper portion of the engagement shaft 44. A tension coil spring 48 for lowering a lever is placed between the pressure lever 47 and the transverse plate 31. The tension spring force of this tension coil spring 48 is set to be larger than a spring force of the coil spring.

An elevation position control lever 49 is fastened to the supporting shaft 46. This elevation position control lever 49 controls an elevation position of the engagement shaft 44 by the pressure lever 47 and sets the elevation positions of the measuring element shaft 35 and the measuring element for a lens frame 37 and the measuring element for a lens 38. This elevation position control lever 49 extends in the direction which is the same as that of the pressure lever 47.

An actuator motor 50 is placed on the lower side of the elevation position control lever 49. This actuator motor 50 includes a motor main body 50a fastened on the transverse plate 31 and a shaft 51 which projects upwardly from the motor main body 50a and has the axis line parallel to the measuring element shaft 35. The elevation position control lever 49 has contact with the upper end of the shaft 51 by the tension spring force of the coil spring 48. In addition, a pulse motor is used for this actuator motor 50. The shaft 51 moves upwardly by the normal rotation of the actuator motor 50 and the shaft 51 moves downwardly by the reverse rotation of the actuator motor 50.

In addition, the coil spring 43, the supporting shaft 46, the pressure lever 47, the tension coil spring 48, the elevation position control lever 49, the actuator motor 50 and the like constitute the moving-up-and-down mechanism of the measuring elements 37, 38.

[Control Circuit]

Figure 10A:
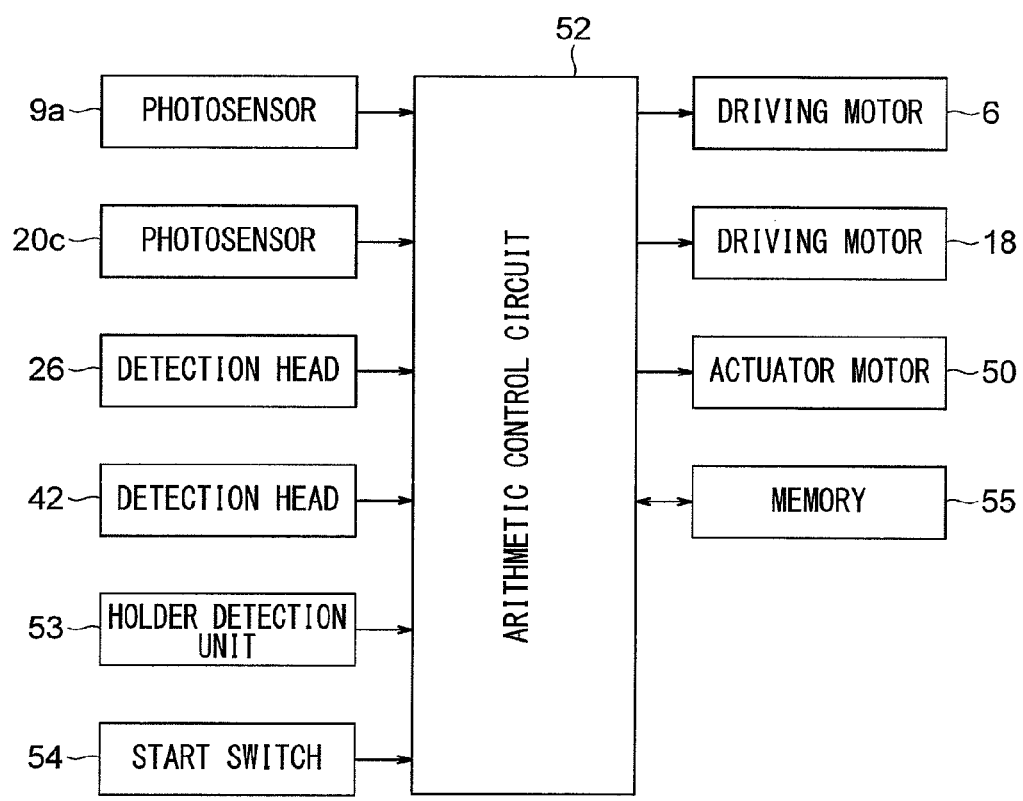
FIG. 10A is a control circuit diagram of the lens shape measurement device illustrated in FIG. 1.
Figure 11:
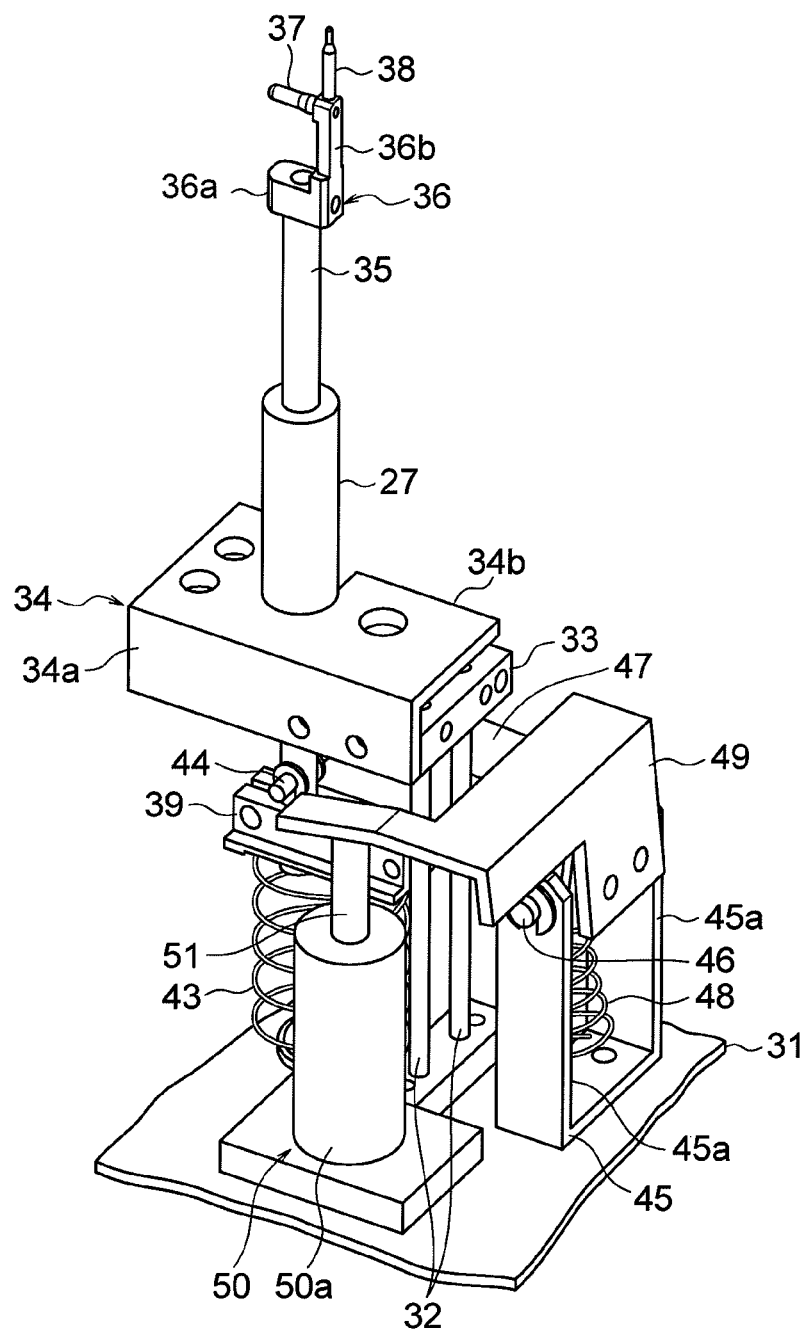
FIG. 11 is a perspective view describing a function of the moving-up-and-down mechanism of the measurement element in FIG. 6.

As illustrated in FIG. 10A, an origin detection signal from the above photosensor (origin detector) 9a, an origin detection signal from the photosensor 20c of the origin detector (origin detection unit), a displacement detection signal (position detection signal) from the detection head 26 of the linear scale 24, the displacement detection signal (position detection signal) from the detection head 42 of the linear scale 40 and the like are input to the arithmetic control circuit (control circuit) 52. The arithmetic control circuit 52 controls the driving of the driving motors 6, 18 and the actuator motor 50.

A holder detector 53 as illustrated in FIG. 1 is set in one side wall of the slide frames 3, 3 as a holder detector. A micro-switch and the like are used for the holder detector 53. The detection signal from the holder detector 53 is input into the arithmetic control circuit 52 as illustrated in FIG. 10A. In the figure, reference number 54 is a start switch for measurement, and reference number 55 is a memory connected to the arithmetic control circuit 52.

[Function]

Hereinafter, a function of such a lens shape measurement device will be described.

(I) Measurement of a Lens Frame Shape

Before the measurement of a lens frame shape of eyeglasses or a lens shape such as a demo-lens is performed in the lens shape measurement device, the upper end of the shaft 51 of the actuator motor 50 is located in the lower end (bottom dead point) as illustrated in FIGS. 6-8. In this position, the pressure lever 47 is biased to rotate downwardly about the supporting shaft 46 by the tension coil spring 48 having a spring force stronger than that of the coil spring 43. The pressure lever 47 thereby presses the measuring element shaft 35 downwardly via the engagement shaft 44. Consequently, the measuring element 37 for a lens frame and the measuring element 38 for a lens are located in the lower end.

When measuring a lens frame shape of eyeglasses by this lens shape measurement device, as described in JP H10-328992A, for example, an eyeglass frame MF having right and left lens frames LF (RF) in FIG. 7 is placed between the slide frames 3, 3 in FIG. 1 (the eyeglass frame MF is not illustrated in FIG. 1) to sandwich the lens frames LF (RF) between the holding bars 3b1, 3b2 as illustrated in FIG. 7. This holding method is similar to that in JP H10-328992A.

The lens frames LF (RF) held between the holding bars 3b1, 3b2 are set to locate above the measuring element 37 for a lens frame before starting the measurement as illustrated in FIG. 7. More specifically, the measuring element 37 for a lens frame is located in an initial position (A) lower than the lens frames LF (RF). Moreover, as illustrated in FIG. 7, the measuring element 37 for a lens frame and the measuring element 38 for a mounting hole are located in an initial position (i) which is the substantial center of the lens frames LF (RF) held between the holding bars 3b1, 3b2.

In this position, the photosensor 9a detects the origin of the horizontal rotation of the rotation base 9 from the light flux from the light emitter 9b, and the origin sensor 20a detects the origin of the displaced position of the slider 15.

In addition, even if the lens frame is curved in the three dimensional direction, the held portion of the lens frame by the holding bars 3b1, 3b2 has a height which is the lowest in the lens frame. In this held portion, the height of the V-groove Ym of the lens frames LF (RF) becomes a set height, namely, a lens frame shape measurement start position B.

From this state, the start switch 54 in FIG. 10A is turned on, the arithmetic control circuit 52 normally rotates the actuator motor 50, and elevates the shaft 51 by a predetermined amount to the position in FIGS. 11-14 from the position in FIGS. 6-8. In this case, the shaft 51 lifts the free end portion of the elevation position control lever 49 upward against the spring force of the tension coil spring 48, and turns the elevation position control lever 49 together with the supporting shaft 46.

Accordingly, the pressure lever 47 turns together with the supporting shaft 46, and the free end portion is elevated by a predetermined amount. By this elevation of the free end portion of the pressure lever 47, the engagement shaft 44 follows the free end portion of the pressure lever 47 to be elevated by the spring force of the coil spring 43, so that the measuring element shaft 35 is elevated by a predetermined amount.

The amount of elevation of the measuring element shaft 35, i.e., the amount of elevation of the shaft 51 by the actuator motor 50 becomes the amount L in which the leading end of the measuring element 37 for a lens frame is elevated to the height C facing the V-groove Ym in the above-described shape measurement start position (B) from the initial position (A) in FIG. 7.

Figure 12:
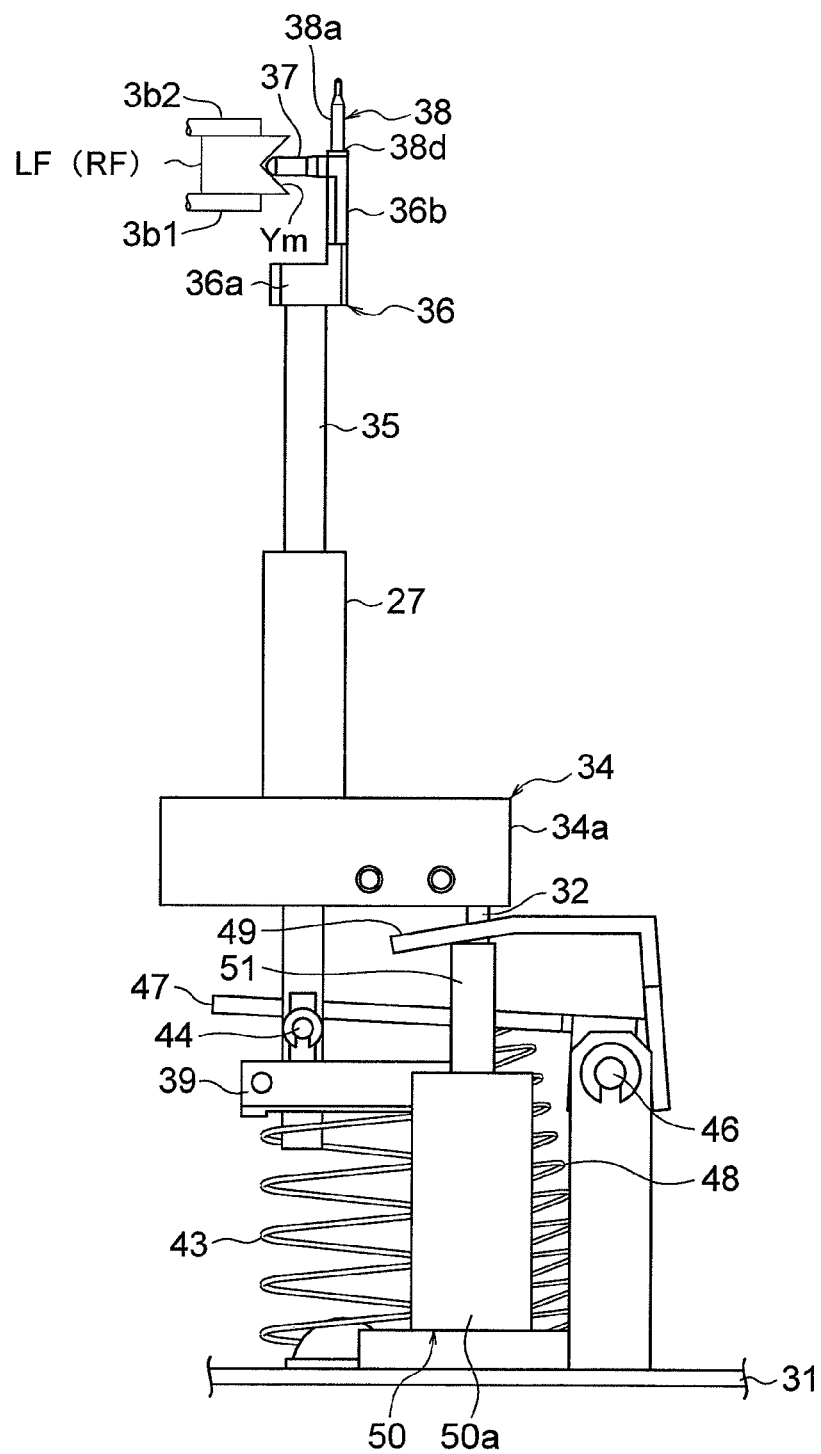
FIG. 12 is a view describing measurement of a lens frame by the moving-up-and-down mechanism in FIG. 11.

Then, the arithmetic control circuit 52 rotates the driving pulley 19 by controlling the driving of the driving motor 18, and displaces the slider 15 along the guide rail 14 by the wire 20 in FIGS. 2, 5B. In this case, the slider 15 moves in the arrow A1 direction in FIG. 7. This movement is performed until the leading end of the measuring element 37 for a lens frame has contact with the V-groove Ym as illustrated in FIG. 12 in the shape measurement start position (B). Moreover, in a state in which the leading end of the measuring element 37 for a lens frame has contact with the V-groove Ym, the measuring element 37 for a lens frame has contact with the V-groove Ym by the spring force of the coil spring 23. Then, the driving motor 18 is stopped.

In addition, when the leading end of the measuring element 37 for a lens frame has contact with the V-groove Ym, the load on the driving motor 18 is increased, so that the current flowing in the driving motor 18 is increased. Therefore, it can be detected that the leading end of the measuring element 37 for a lens frame has contact with the V-groove Ym by detecting the current change, and thus, the driving motor 18 is stopped.

Figure 15:
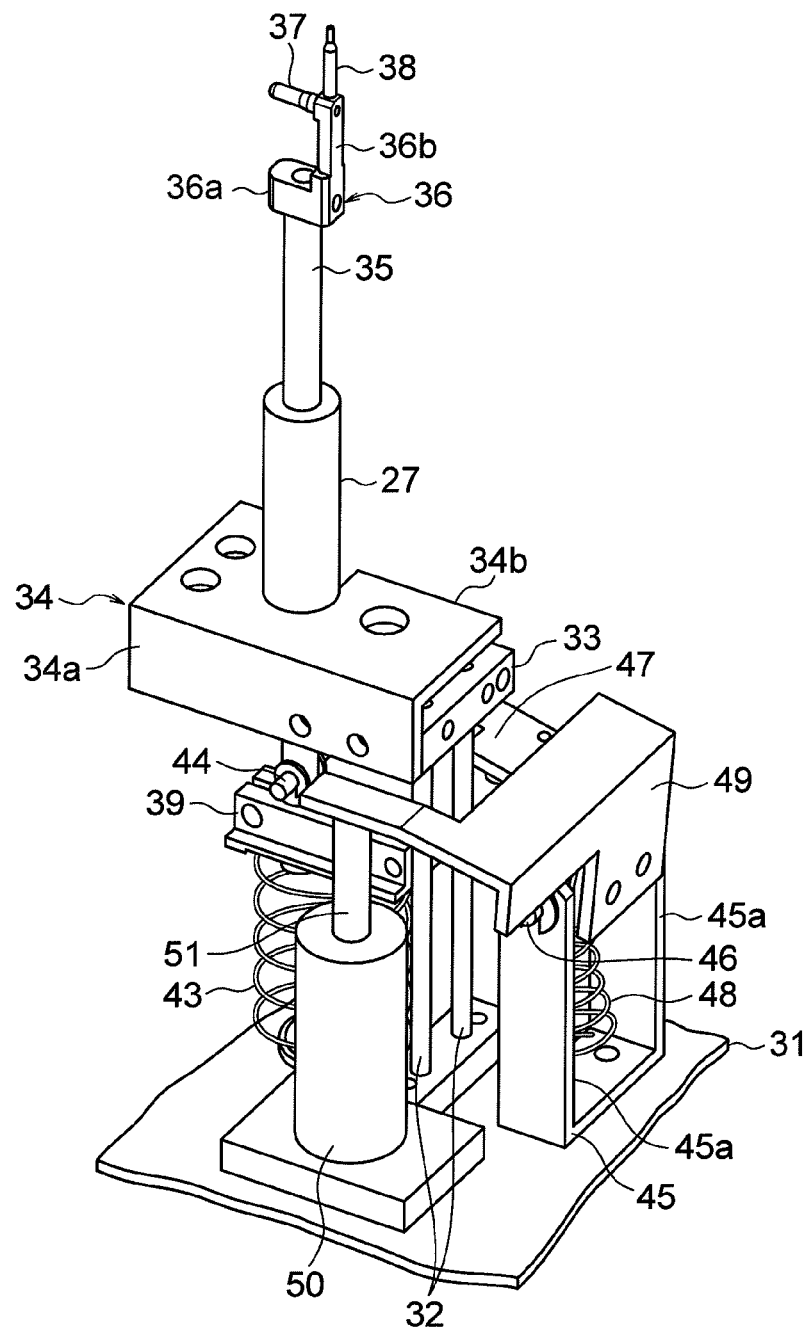
FIG. 15 is a perspective view describing the function of the moving-up-and-down mechanism of the measuring element in FIG. 6.
Figure 16:
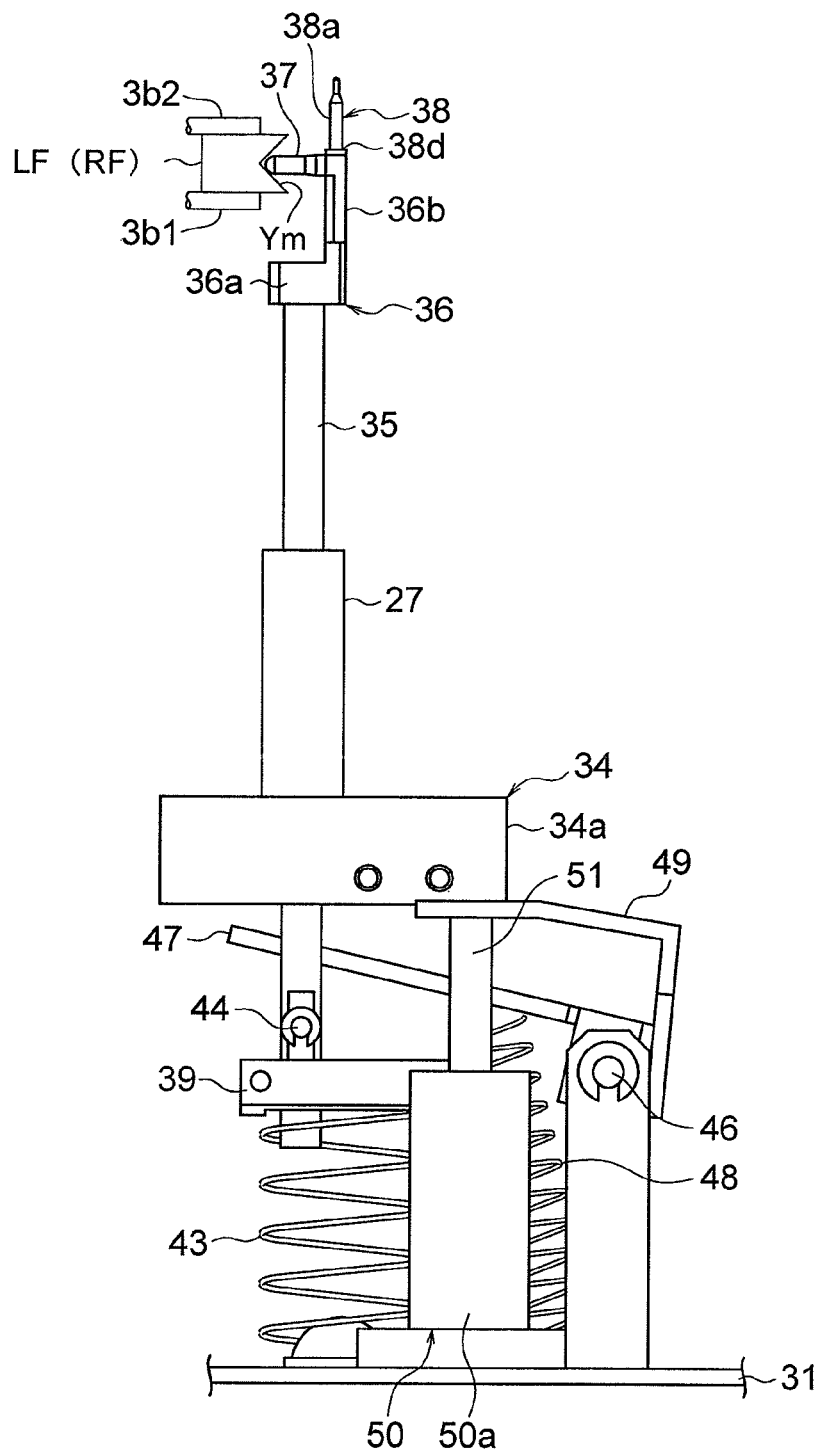
FIG. 16 is a view describing measurement of a lens frame by the moving-up-and-down mechanism in FIG. 15.
Figure 17:
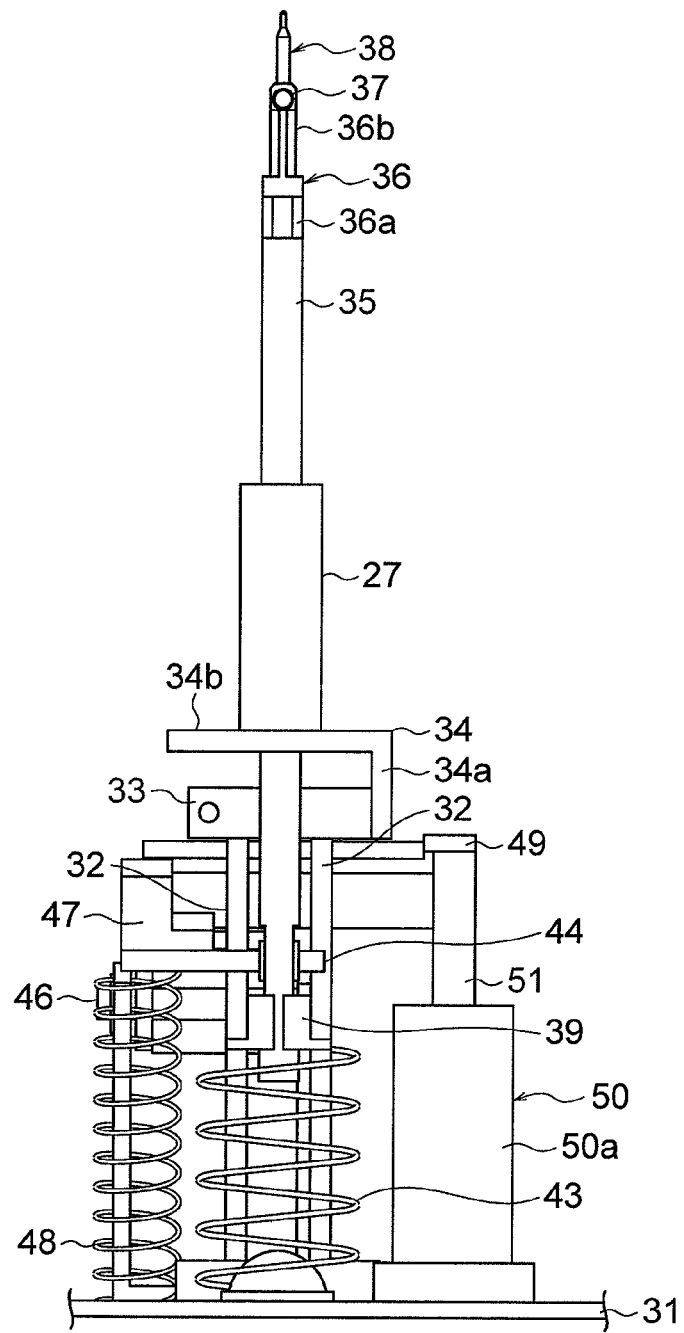
FIG. 17 is a left side view of FIG. 16.

After that, the arithmetic control circuit 52 normally rotates the actuator motor 50, and displaces the shaft 51 by a predetermined amount to the position in FIGS. 15-17 from the position in FIGS. 11-14. In this case, the shaft 51 lifts the free end portion of the elevation position control lever 49 against the spring force of the tension coil spring 48, and turns the elevation position control lever 49 together with the supporting shaft 46.

Accordingly, the pressure lever 47 turns together with the supporting shaft 46, the free end portion is elevated at predetermined amount, the free end portion of the pressure lever 47 moves away at predetermined amount from the engagement shaft 44, and the measuring element shaft 35 becomes vertically displaceable.

Next, the arithmetic control circuit 52 controls the driving of the driving motor 6 to normally rotate the driving motor 6. The rotation of the driving motor 6 is transferred to the driven gear 5 via the pinion 7 and the timing belt 8, so that the driven gear 5 horizontally rotates together with the rotation base 9 (refer to FIG. 5A).

With this rotation of the rotation base 9, the slider 15 and a number of components arranged in the slider 15 horizontally rotate together with the rotation base 9, and the leading end of the measuring element 37 for a lens frame slides along the V-groove Ym. In this case, since the slider 15 moves along the guide rail 14 together with the measuring element 37 for a lens frame, the displacement when the slider 15 is displaced from the origin position of the slider 15 becomes the same as the displacement of the leading end of the measuring element 37 for a lens frame. This displacement is obtained by the arithmetic control circuit 52 from the detection signal of the detection head 26 of the linear scale 24.

Moreover, since the measurement (length) from the center of the measuring element shaft 35 to the leading end of the measuring element 37 for a lens frame is known, if the distance from the rotation center of the rotation base 9 when the slider 15 is in the origin to the leading end of the measuring element 37 for a lens frame is set in advance, even if the distance from the rotation center of the rotation base 9 to the leading end of the measuring element 37 for a lens frame is changed when the slider 15 is displaced along the guide rail 14, the change in this distance can be a moving radius $\rho i$.

Therefore, the shape (lens frame shape) of V-groove Ym of the lens frame LF (RF) in the circumferential direction can be obtained as lens frame shape information ($\theta i$, $\rho i$) of a polar coordinate by obtaining the rotation angle $\theta i$ of the rotation base 9 by the rotation of the driving motor 9 from the number of driving pulses of the driving motor 6 and obtaining the moving radius $\rho i$ corresponding to the rotation angle $\theta i$.

When the leading end of the measuring element 37 for a lens frame slides along the V-groove Ym, if the lens frame LF (RF) has a curvature in the vertical direction, the curvature state in the vertical direction is obtained as a displacement in the vertical direction by the arithmetic control circuit 52 from the detection signal of the detection head 42 of the linear scale 40. This displacement in the vertical direction becomes a position $Z i$ in the vertical direction.

Consequently, the shape of the lens frame LF (RF) is obtained as three-dimensional lens frame shape information (θi, ρi, Zi) by the arithmetic control circuit 52. The obtained three-dimensional lens frame shape information (θi, ρi, Zi) is stored in a memory 55 by the arithmetic control circuit 52.

Figure 23A:
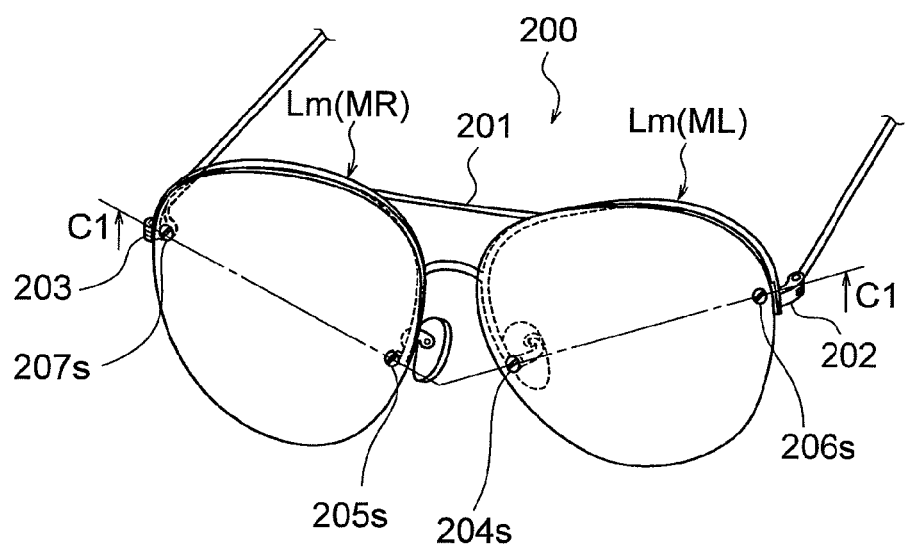
FIG. 23A is a perspective view illustrating an example of 2-point frame eyeglasses.
Figure 23B:
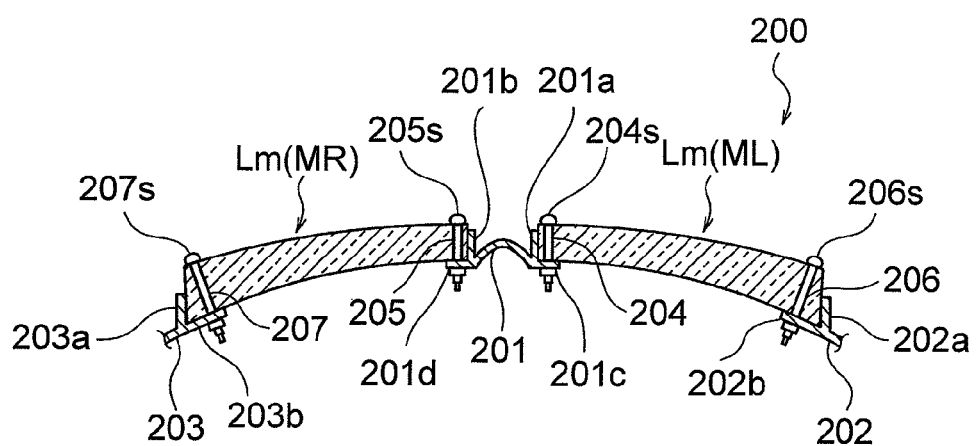
FIG. 23B is a cross-sectional view along a line C1-C1 in FIG. 23A.

(II) Measurement of a Lens such as a Demo-Lens (II-a) Setting of a Lens such as a Demo-Lens When measuring a shape of right and left lenses Lm (ML), Lm (MR) (demo-lenses of dummy lenses of eyeglass lenses) of two-point fame eyeglasses M as illustrated in FIGS. 23A, 23B, by the lens shape measurement device, a known lens holder disclosed in JP H10-328992A and JP H08-294855A, for example, can be used. In order to hold a lens such as a demo-lens in a lens holder in JP H 10-328992A, a suction pad and a suction pad holding structure disclosed in JP H08-294855A can be adopted. However, the structure of this lens holder is not an essential to the present invention, so the description thereof will be omitted.

A lens such as a demo-lens is held by the above-described lens holder, the lens holder is placed between the slider frames 3, 3, and the side wall of the lens holder in JP H10-328992A or the flange of the side portion in JP H08-294855A is sandwiched between the fastening holding bar 3b1 and the movable holding bar 3b2. In this case, the lens held by the lens holder is directed on the lower side.

In the two-point frame eyeglass 200 illustrated in FIG. 23A, a bridge 201 is mounted between the right and left lenses MR, ML (between nose sides), and attachments for temples 202, 203 are respectively mounted on opposite sides (ear sides) of the right and left lenses Lm (MR), Lm (ML).

This bridge 201, as illustrated in FIG. 23B, has side plate portions 201a, 201b which have contact with the nose sides (opposing sides) of the circumferential faces (edge faces) of the lenses Lm (ML), Lm (MR), and fixing plate portions 201c, 201d which have contact with the back side refracting surfaces of the lenses Lm (MR), Lm (ML).

The attachment for a temple 202, as illustrated in FIG. 23B, has a side plate portion 202a which has contact with the ear side of the circumferential surface (edge face) of the lenses Lm (ML), Lm (MR) and a fixing plate portion 202b which has contact with the back side refracting surface of the lenses Lm (ML), Lm (MR). The attachment for a temple 203 has a side plate portion 203a which has contact with the ear side of the circumferential surface (edge face) of the lenses Lm (ML), Lm (MR) and a fixing plate portion 203b which has contact with the back side refracting surface of the lenses Lm (ML), Lm (MR).

As illustrated in FIG. 23B, the mounting holes 204, 205 are formed in end portions on the nose sides (end portions opposing each other) of the lenses Lm (ML), Lm (MR), and the mounting holes 206, 207 are formed in end portions on the ear sides of the lens lenses Lm (ML), Lm (MR).

The left fixing plate portion 201a of the bridge 201 is fixed to the lens Lm (ML) by a screw 204s inserted into the mounting hole 204, and the right fixing plate portion 201b of the bridge 201 is fixed to the lens Lm (MR) by a screw 205s inserted into the mounting hole 205. In addition, the fixing plate portion 202b of the attachment for a temple 202 is fixed to the lens Lm (ML) by a screw 206s inserted into the mounting hole 206, and the fixing plate portion 203b of the attachment for a temple 203 is fixed to the lens Lm (MR) by a screw 207s inserted into the mounting hole 207. Hereinafter, the lenses Lm (ML), Lm (MR) will be explained simply as the lens Lm.

(II-2) Contact Operation 1 of the Measuring Element for a Lens 36 to a Standard Lens If the lens holder (not shown) is detected by the holder detector 53, this detection signal is input into the arithmetic control circuit 52. Thereby, the arithmetic control circuit 52 displaces the slider 15 forward along the guide rail 14 from the origin position, and locates the measuring element for a lens 36 on the outside of the rim of the lens held by the lens holder (not shown).

Next, the arithmetic control circuit 52 normally rotates the above-described actuator motor 50, so as to elevate the measuring element for a lens frame 37 from the initial position (A) to the height (B) illustrated in FIG. 7. Accordingly, the measuring element for a lens 36 is elevated together with the measuring element for a lens frame 37, and is elevated to a height corresponding to the rim of the lens held by the lens holder (not shown).

Figure 18:
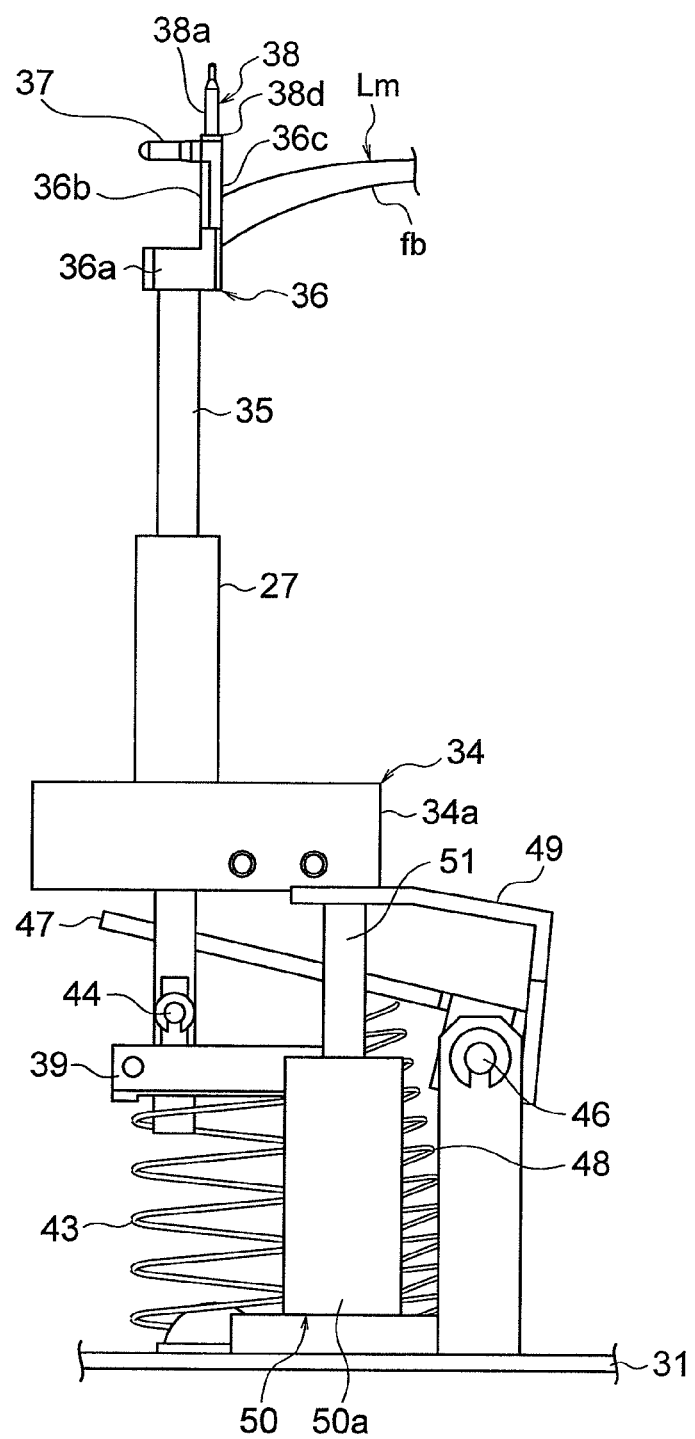
FIG. 18 is a view describing measurement of a lens by the moving-up-and-down mechanism in FIG. 2.

After that, the arithmetic control circuit 52 controls the driving of the driving motor 18, and transfers the rotation of the driving motor 18 to the slider 15 by the wire 20, and controls the displacement of the slider 15 along the guide rail 14 such that the measuring element for a lens 36 is displaced to have contact with the circumferential face of the lens Lm held by the lens holder (not shown) as illustrated in FIG. 18. Then, the measuring element for a lens 36 has contact with the circumferential face of the lens Lm as illustrated in FIG. 18.

Such control can be performed according to standard lens data previously obtained by an experiment and the like.

(II-c) Contact Operation 2 of the Measuring Element 36 for a Lens to a Lens

In addition, another method can be used as the method which brings the measuring element for a lens 36 into contact with the circumferential face of the lens Lm. More specifically, at first, the actuator motor 50 normally rotates to lift the free end portion of the elevation position control lever 49 to the position in FIGS. 15-17 against the spring force of the tension coil spring 48 from the position in FIG. 7, and to rotate the supporting shaft 46. In this case, the supporting shaft 46 rotates the pressure lever 47, and lifts the free end portion of the pressure lever 47 in the direction which is the same as the direction of the free end portion of the elevation position control lever 49. Accordingly, the engagement shaft 44 is elevated together with the measuring element shaft 35 by the spring force of the coil spring 43, and the measuring element for a lens 36 is elevated, so that the measuring element for a lens 36 has contact with the back side refracting surface of the lens Lm. After that, by controlling the driving of the driving motor 18, the slider 15 is displaced at a predetermined speed along the guide rail 14, the measuring element for a lens 36 is displaced on the rim portion side along the back side refracting surface of the lens Lm, and the measuring element for a lens 36 is displaced to a position which is significantly separated from the rim of the back side refracting surface of the lens Lm. In this case, even if the measuring element for a lens 36 is elevated together with the measuring element for a lens frame 37 by the spring force of the coil spring 43 out of the rim of the back side refracting surface of the lens Lm, the crushing of the measuring element 37 for a lens frame to the lens Lm can be avoided by increasing the moving speed of the measuring element for a lens 36 on some level because the spring force of the coil spring 43 is weak.

The withdrawn position of the measuring element 36 for a lens out of the back side refracting surface of the lens Lm can be determined if the linear scale 40 detects the position when the measuring element for a lens 36 is elevated. The position of the horizontal direction of the measuring element for a lens 36 in the withdrawn position can be obtained from the detection signal of the linear scale 24. Therefore, by the detection signals from the linear scales 24, 40 in the withdrawn position, the position where the measuring element for a lens 36 separates from the back side refracting surface of the lens Lm can be obtained as three-dimensional coordinate data. In addition, by controlling the driving of the actuator motor 50 according to the three-dimensional coordinate data, the height of the free end portion of the elevation position control lever 49 is adjusted, and the height of the free end portion of the pressure lever 47 is adjusted. Consequently, the measuring element for a lens 36 can be adjusted to the height corresponding to the rim of the lens Lm held by the lens holder (not shown). After that, the arithmetic control circuit 52 controls the driving of the driving motor 18 to transfer the rotation of the driving motor 18 to the slider 15 by the wire 20, and controls the displacement of the slider 15 along the guide rail 14 such that the measuring element for a lens 36 is moved to have contact with the circumferential face of the lens Lm held by the lens holder (not shown) as illustrated in FIG. 18. Then, the measuring element for a lens 36 has contact with the circumferential face of the lens Lm.

(II-d) Measurement of a Rim Shape by the Measuring Element for a Lens 36

Next, the arithmetic control circuit 52 controls the driving of the driving motor 6 to normally rotate the driving motor 6. The rotation of the driving motor 6 is transferred to the driven gear 5 via the pinion 7 and the timing belt 8, so that the driven gear 5 horizontally rotates together with the rotation base 9.

With the rotation of the rotation base 9, the slider 15 and a number of components arranged in the slider 15 horizontally rotate together with the rotation base 9, and the measuring element for a lens 36 slides along the circumferential face (edge) of the lens Lm. In this case, since the slider 15 displaces along the guide rail 14 together with the measuring element for a lens frame 37, the displacement when the slider 15 displaces from the origin position of the slider 15 becomes the same as the displacement of the leading end of the measuring element for a lens frame 37. This displacement can be obtained by the arithmetic control circuit 52 from the detection signal of the detection head 26 of the linear scale 24.

Moreover, since the measurement (length) from the center of the measuring element shaft 35 to the leading end of the measuring element for a lens frame 37 is known, if the distance from the rotation center of the rotation base 9 when the slider 15 is in the origin to the leading end of the measuring element for a lens frame 37 is previously set, even if the distance from the rotation center of the rotation base 9 to the measuring element for a lens 36 is changed when the slider 15 is displaced along the guide rail 14, the change in this distance can be a moving radius $\rho i$.

Therefore, the circumferential face shape (lens shape) of the lens Lm can be obtained as lens shape information $(\theta i, \rho i)$ of a polar coordinate by obtaining the rotation angle $\theta i$ of the rotation base 9 by the rotation of the driving motor 6 from the number of driving pulses of the driving motor 6 and obtaining the moving radius $\rho i$ corresponding to the rotation angle $\theta i$.

[Detection of a Concave on a Rim of a Lens]

Figure 31A:
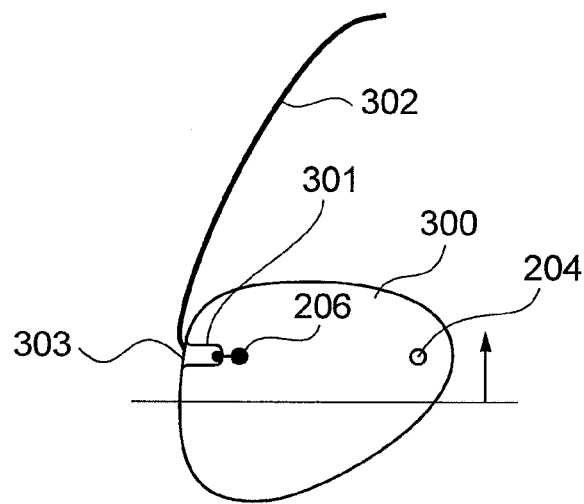
FIG. 31A is an explanatory view illustrating a modified example.
Figure 31B:
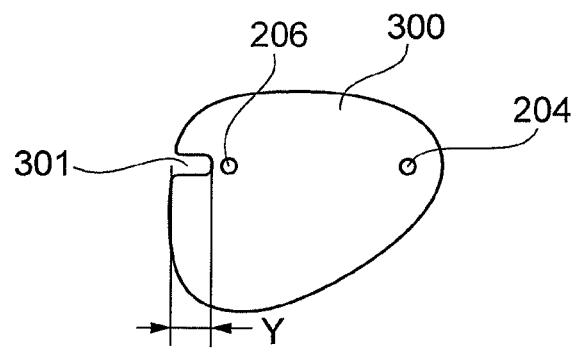
FIG. 31B is an explanatory view illustrating a modified example.

As illustrated in FIG. 31A, a two-point frame includes a concave 301 (see FIG. 31B) on a rim of a lens 300 and an attachment 303 for attaching a temple 302 by using the concave 303. Reference numerals 206, 204 denote mounting holes for attaching attachments, respectively.

If such a lens is measured, depression is generated in a part of the lens data. Generally, the concave is placed at an upper half of the lens. Therefore, concave and convex by a measurement error and the concave for attachment are distinguished according to the conditions, and the position of the concave is detected. Next, the length Y in the central direction of the concave is measured by moving the measurement element for a mounting hole 38 in the lateral direction. The length can be input from an external input device.

Figure 19:
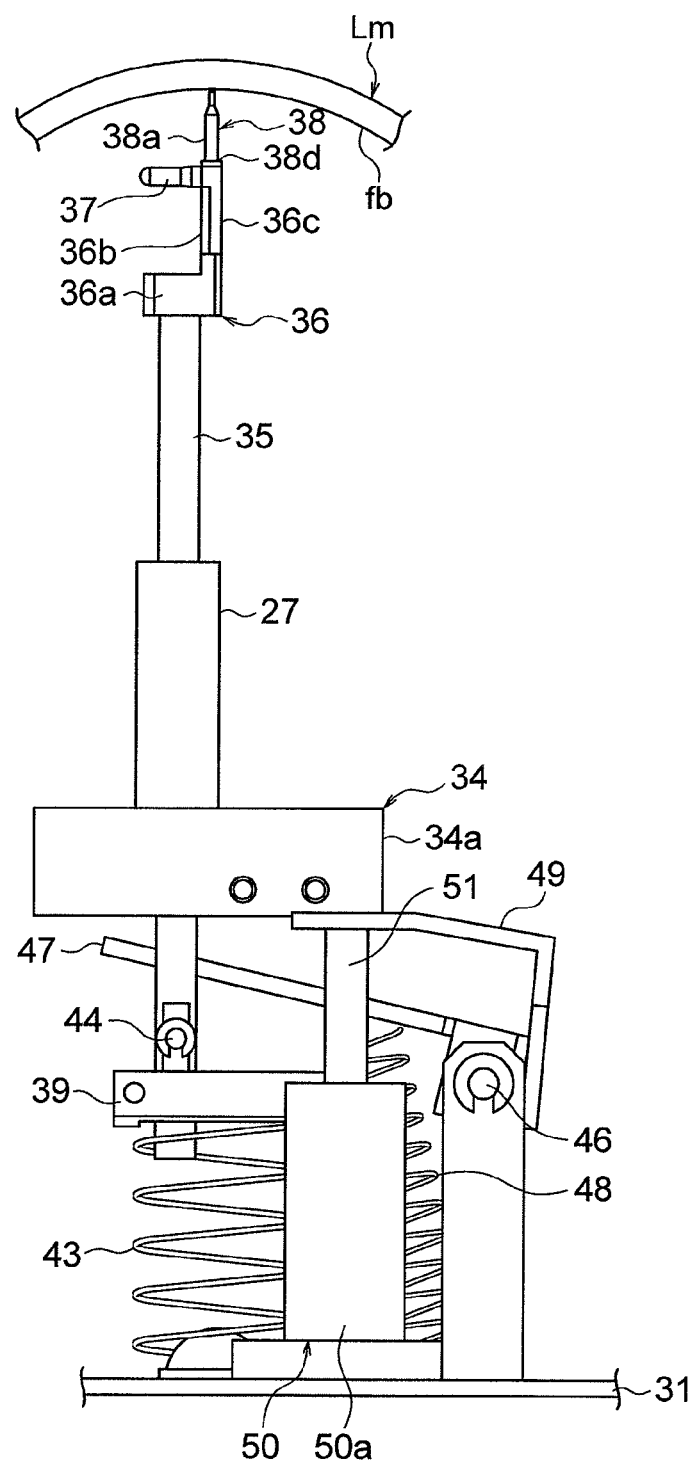
FIG. 19 is a view describing measurement of a lens by the moving-up-and-down mechanism in FIG. 2.

(III) Measurement of a Curvature of the Back Side Refracting Surface of the Lens Lm When only two dimensional lens shape information $(\theta i, \rho i)$ is obtained in the rim shape measurement (outer circumferential shape measurement) of the above described lens Lm, the curvature of the back side refracting surface fb of the lens Lm illustrated in FIG. 19 is calculated by the measurement, and the position Zi of the vertical direction of the edge of the lens Lm in the lens shape information $(\theta i, \rho i)$ can be obtained from the calculated curvature and the lens shape information $(\theta i, \rho i)$, so that the three-dimensional lens shape information $(\theta i, \rho i, Zi)$ can be obtained. The three-dimensional circumferential length of the lens Lm which is a dummy lens can be calculated from the three-dimensional shape information $(\theta i, \rho i, Zi)$. Hereinafter, a process which obtains a curvature of the back side refracting surface of the lens Lm is described.

Step S1

Figure 20:
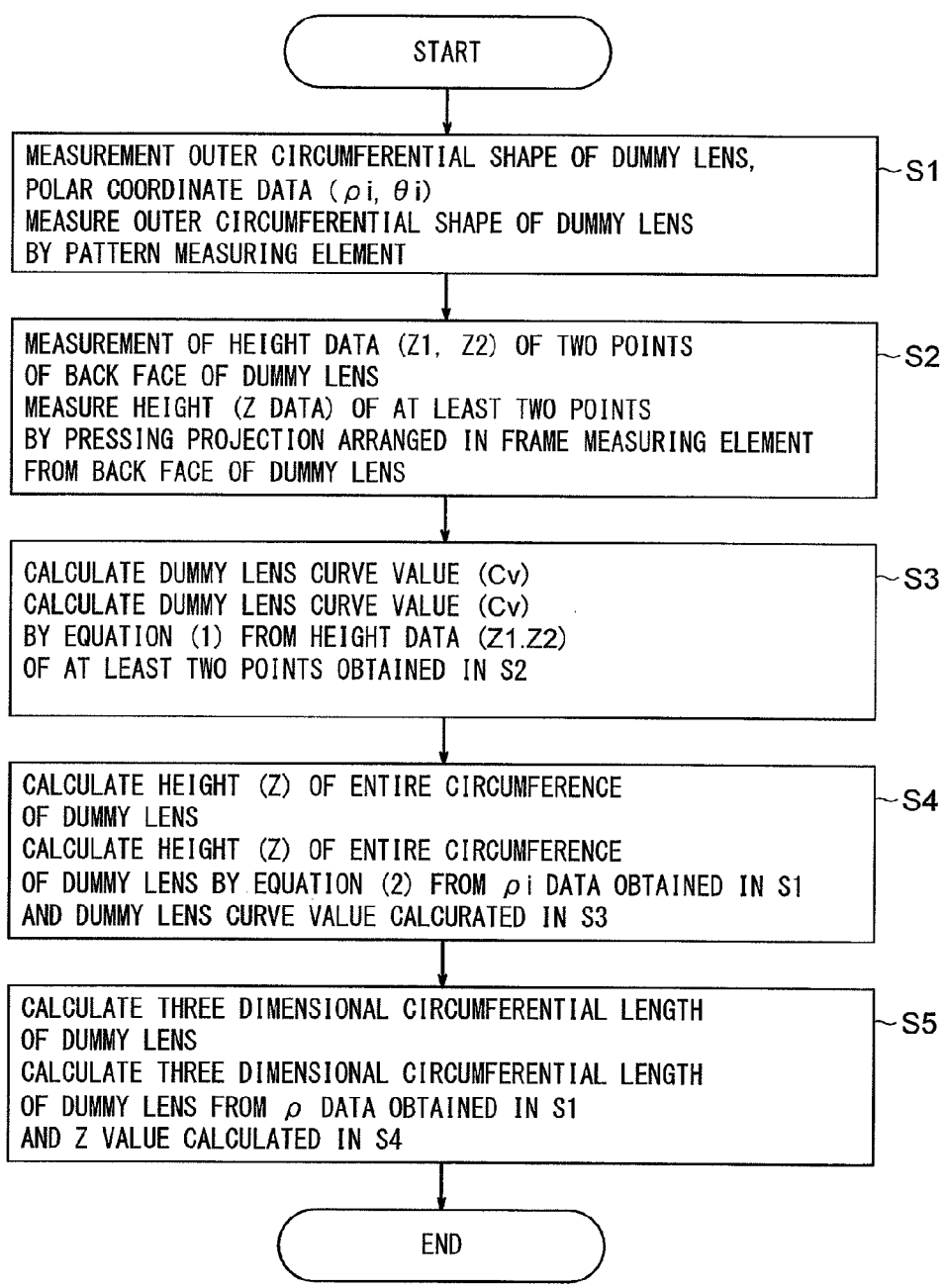
FIG. 20 is a flow chart for obtaining a curvature of a refracting surface of the lens by a lens shape measurement device in FIGS. 1-5.

As illustrated in FIG. 20, the two-dimensional lens shape information $(\theta i, \rho i)$ is obtained in the rim shape measurement (outer circumferential shape measurement) of the lens Lm in Step S1, then the operation moves to Step S2.

Step S2

In this Step S2, the arithmetic control circuit 52 measures the curvature of the back side refracting surface fb of the lens Lm illustrated in FIG. 19. For this measurement, at first, the operation of the actuator motor 50 is controlled similar to the measurement of the lens frame in as described above, and the upper end of the measuring element for a lens 36 is brought into contact with the back side refracting surface fb of the lens Lm held by the not shown lens holder with the spring force of the coil spring 43.

In this case, the lens Lm is retained by a suction pad, and this suction pad is detachably attached to the not shown lens holder, so that the lens Lm is held by the lens holder. Moreover, in a state in which the lens holder is held between the lens frames 3, 3, it is set such that the vertically extending axis line (not shown) of the suction pad of the lens holder is aligned with the vertically extending axis line (shaft line O in FIG. 7) of the measuring element for a lens 36 when the slider 15 is in the origin position. The aligned position (aligned point) of the axis lines is set to an origin P0 in the X direction of the measurement (radius direction of lens Lm).

Figure 21A:
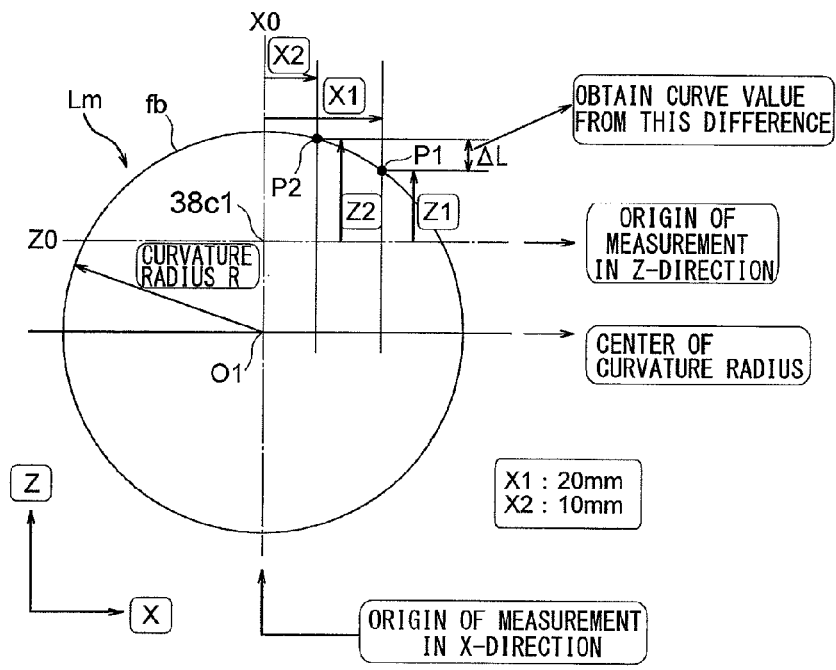
FIG. 21A is a view for obtaining a curvature of a lens by the measurement of the lens shape measurement device in FIGS. 1-5.
Figure 21B:
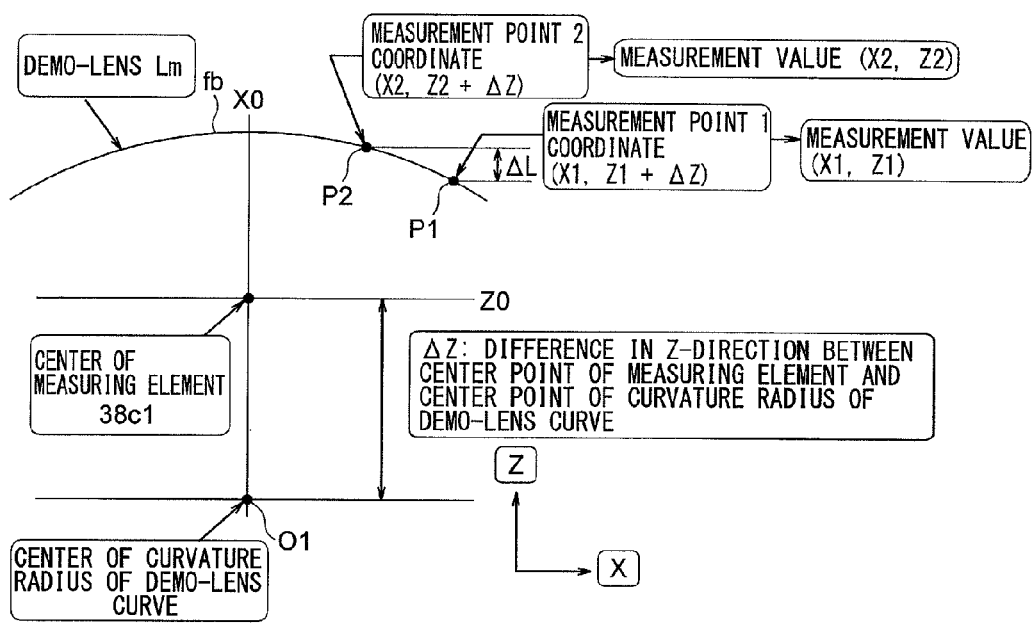
FIG. 21B is a partially enlarged view of FIG. 21A.

As illustrated in FIG. 7, when the measuring element shaft 35 is lowered on the lowermost side, as illustrated in FIG. 7 and the measuring element for a lens frame 37 is in the initial position (A), the measuring element for a lens 36 is located in the initial position on the lowermost side. The upper end (leading end) position of the measuring element for a lens 36 is set as the initial position (C), and this initial position (C) is set to the origin Z0 in the Z direction (vertical direction) of the measurement in FIGS. 21A, 21B.

In such a condition, the arithmetic control circuit 52 controls the operation of the driving motor 18, and displaces the slider 15 along the guide rail 14 by the wire 20 which works with the driving motor 18, and the upper end (leading end) of the measuring element 36 for a lens is sequentially moved to the measurement points P2, P1 of the radius direction (X direction) of the lens Lm. This measurement point P2 is a position which is moved in the radius direction (X direction) of the lens Lm at a distance X2 from the origin X0 in the X direction, and the measurement point P1 is a position which is moved in the radius direction (X direction) of the lens Lm at the distance X1 (X1>X2) from the origin X0 in the X direction.

In this case, the arithmetic control circuit 52 calculates the heights Z2, Z1 in the Z direction (vertical direction) in the distances X2, X1 of the back side refracting surface fb of the lens Lm from the displacement detection signal from the linear scale 40, and the operation moves to Step S3. The heights Z2, Z1 in the Z-direction are distances from the origin Z0 in the Z-direction.

Step 3

In this Step 3, the arithmetic control circuit 52 obtains a curve value from the curvature of the back side refracting surface fb of the lens Lm. In this case, where the distance from the curvature center O1 of the back side refracting surface fb of the lens Lm to the origin Z0 in the Z-direction is $\Delta Z$, the height from the curvature center O1 to the measurement point P2 is $Z2 + \Delta Z$ and the height from the curvature center O1 to the measurement point P1 is $Z1 + \Delta Z$. Therefore, the coordinate of the measurement point P2 is $(X2, Z2+\Delta Z)$ and the coordinate of the measurement point P1 is $(X1, Z1+\Delta Z)$.

The arithmetic control circuit 52 calculates by using a circular equation in order to obtain a curvature from the coordinate $(X2, Z2+\Delta Z)$ of the measurement point P2 and the coordinate $(X1, Z1+\Delta Z)$ of the measurement point P1. The circular equation is as follows where the curvature radius diameter of the lens Lm is R.

$$X^2 + Z^2 = R^2$$

The equation passing through the measurement point P1 from this equation is as follows.

$$(X1)^2 + (Z1+\Delta Z)^2 = R^2 \quad (1)$$

The equation passing through the measurement point P2 is as follows.

$$(X2)^2 + (Z2+\Delta Z)^2 = R^2 \quad (2)$$

The following equation is obtained from (1)-(2).

$$(X1)^2 - (X2)^2 + (Z1+\Delta Z)^2 - (Z2+\Delta Z)^2 = 0$$

Then, the following equation is obtained by developing the above equation.

$$(X1)^2 - (X2)^2 + (Z1)^2 + 2(Z1)\cdot\Delta Z + \Delta Z^2 - (Z2)^2 - 2(Z2)\cdot\Delta Z - \Delta Z^2 = 0$$

And, the following equation is obtained.

$$(X1)^2 - (X2)^2 + (Z1)^2 + 2(Z1)\cdot\Delta Z - (Z2)^2 - 2(Z2)\cdot\Delta Z = 0$$

Then, the following equation is obtained if the above equation is simplified by combing $\Delta Z$.

$$[2(Z1) - 2(Z2)]\Delta Z = (X2)^2 - (X1)^2 + (Z2)^2 - (Z1)^2$$

$\Delta Z$ can be obtained from this equation. Namely, $\Delta Z$ is as follows.

$$\Delta Z = \frac{(X2)^2 - (X1)^2 + (Z2)^2 - (Z1)^2}{2[(Z1) - (Z2)]} \quad \text{[Equation 1]}$$

The above is obtained.

Figure 22A:
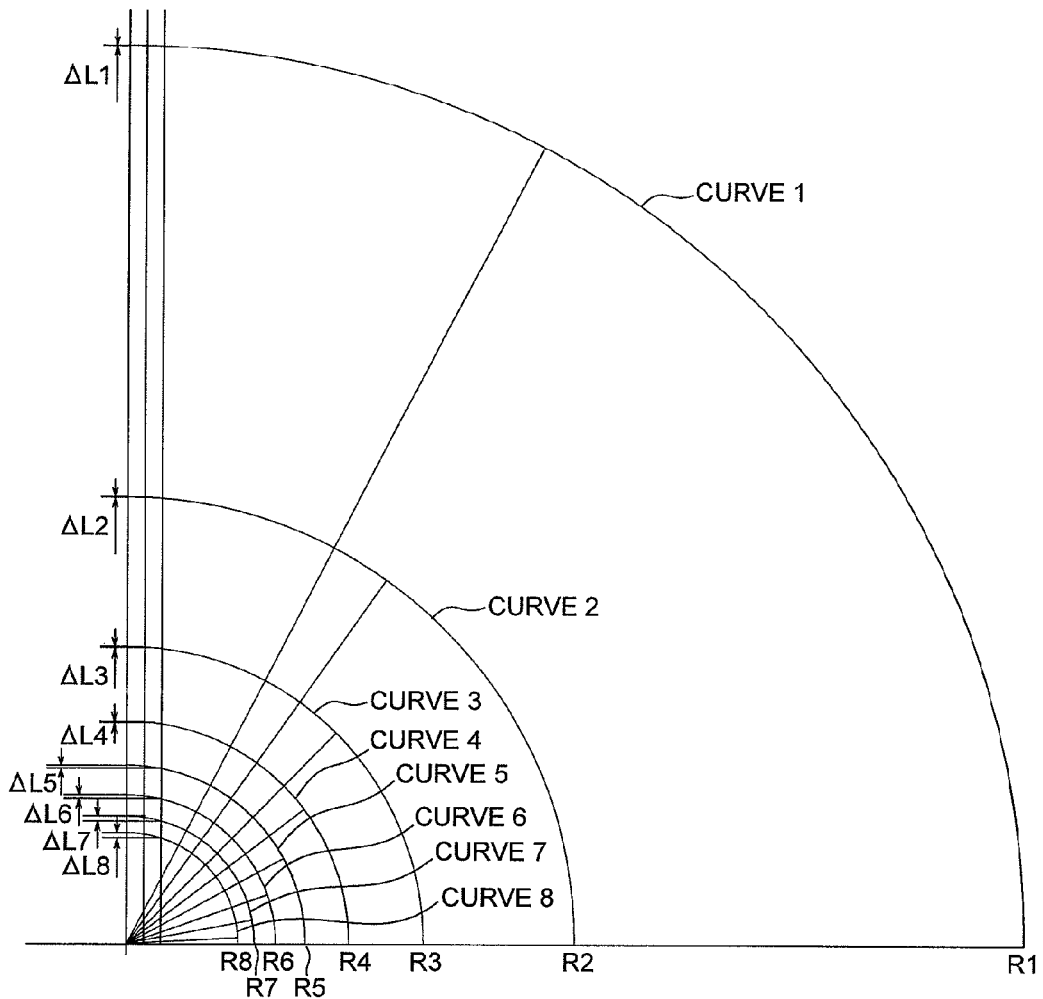
FIG. 22A is a view describing a curve value of an eyeglass lens.
Figure 22B:
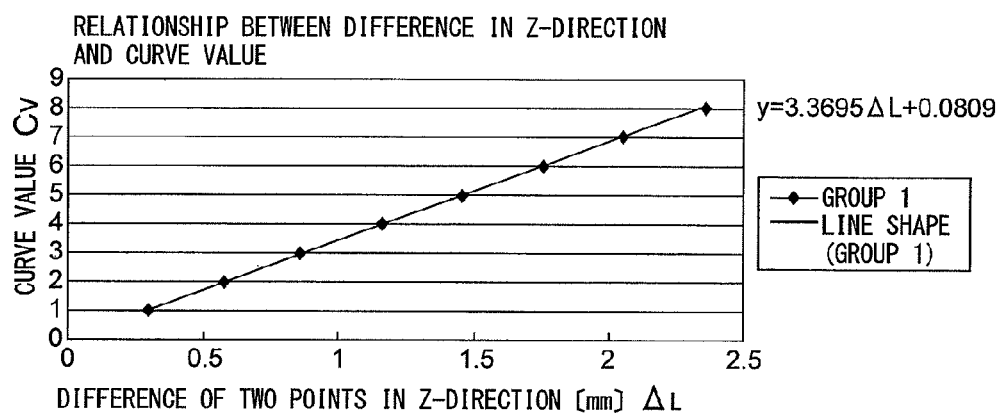
FIG. 22B is a characteristic line view illustrating relationship between the curve value in FIG. 22A and a difference between two measurement points of a refracting surface of a lens.

Meanwhile, the curve value of the eyeglass lens is set within a range from the curve of 1 to the curve of 8 as illustrated in FIGS. 22A, 22B. The curvature radius R1-R8 from the curve of 1 to the curve of 8 is as illustrated in Table 1.

TABLE 1

| CURVE VALUE | CURVATURE RADIUS Ri (mm) | DIFFERENCE IN Z-DIRECTION (mm) | CURVE VALUE OBTAINED FROM APPROXIMATE CURVE | ERROR FROM THEORETICAL VALUE |
|---|---|---|---|---|
| 1 | R1: 523 | $\Delta$L1: 0.287 | 1.0479465 | 0.0479465 |
| 2 | R2: 261.5 | $\Delta$L2: 0.575 | 2.0183625 | 0.0183625 |
| 3 | R3: 174.3333 | $\Delta$L3: 0.854 | 2.958453 | −0.041547 |
| 4 | R4: 130.75 | $\Delta$L4: 1.156 | 3.976042 | −0.023958 |
| 5 | R5: 104.6 | $\Delta$L5: 1.451 | 4.9700445 | −0.0299555 |
| 6 | R6: 87.16667 | $\Delta$L6: 1.75 | 5.977525 | −0.022475 |
| 7 | R7: 74.71429 | $\Delta$L7: 2.054 | 7.001853 | 0.001853 |
| 8 | R8: 5.375 | $\Delta$L8: 2.365 | 8.0497675 | 0.0497675 |

Where the above X1=10 mm and the above X2=5 mm, the Z-direction difference $\Delta L$ ($\Delta L - \Delta L8$) of the measurement points P1, P2 can be obtained corresponding to the curve of 1 to the curve of 8 as illustrated in Table 1. In other words, where the Z-direction difference ($\Delta L$ in FIGS. 21A, 21B) of the measurement points P1, P2 is 0.287 of $\Delta L1$, for example, the curvature radius of the lens Lm as a demo-lens can be determined as 523 mm of R1 corresponding to the curve of 1 (curve value 1).

In addition, the Z-direction difference ($\Delta L$ in FIGS. 21A, 21B) of the measurement points P1, P2 and the curve value Cv can be expressed in linear approximation, and that equation is as follows.

Curve value = 3.3695 × Z-direction difference $\Delta L$ + 0.0809

The relationship between the curve value Cv and the Z-direction difference $\Delta L$ ($\Delta L1 - \Delta L8$) is linearly proportional as illustrated in FIG. 22B.

As described above, the arithmetic control circuit 52 obtains the curve value of the back side refracting surface fb of the lens Lm, and the operation moves to Step S4.

Step 4

In Step S4, the arithmetic control circuit 52 obtains the positional information Zbi in the Z-direction of the rim of the back side refracting surface fb of the lens Lm from the curve value Cv obtained according to the Z-direction difference $\Delta L$ ($\Delta L1 - \Delta L8$) and the lens shape information ($\theta i, \rho i$), and the operation moves to Step S5.

Step 5

In Step 5, the arithmetic control circuit 52 obtains the three-dimensional lens shape information ($\theta i, \rho i, Zbi$) from the two-dimensional lens shape information ($\theta i, \rho i$) and the positional information Zbi of the Z-direction of the rim of the back side refracting surface fb of the lens Lm obtained in Step S4, and the step is completed. The obtained three-dimensional lens shape information ($\theta i, \rho i, Zbi$) is stored in a memory 55 by the arithmetic control circuit 52.

(IV) Measurement of a Position of a Mounting Hole of a Lens Lm

Next, as illustrated in FIG. 23B, the lens Lm (ML) includes the mounting holes 204, 206 and the lens Lm (MR) includes the mounting holes 205, 207.

Where the lens Lm of the three-dimensional shape information ($\theta i, \rho i, Zbi$) obtained by the measurement in the above-described (II), (III) is lens Lm (ML) in FIG. 23, the arithmetic control circuit 52 sets mounting hole detection areas (sensing areas) Sa, Sb in the right and left portions of the lens Lm (ML) as illustrated in FIG. 24.

This mounting hole detection areas (sensing areas) Sa, Sb are set between right and left ends Pa, Pb of the les Lm (ML) and positions a1, a2 which are located inside at at a predetermined distance La from the right and left ends Pa, Pb in the right and left direction. These predetermined areas sa, sab are set inside by a predetermined amount a (for example, 1 mm) from the outer circumferential face of the lens Lm as illustrated in FIG. 24D. This is because if the measuring element for a mounting hole 38 is deviated from the lens Lm when detecting the mounting holes 204, 206 by moving the measuring element for a mounting hole 38 in the mounting hole detection areas Sa, Sb, it takes time to get the measuring element for a mounting hole 38 back to the original position. Therefore, it is necessary for the measuring element for a mounting hole 38 not to deviate from the lens Lm. In addition, 1 mm is an example, and it is not limited to 1 mm. That is, it is preferable for the measuring element for a mounting hole 38 to detect a mounting hole without deviating from the lens Lm.

Figure 24A:
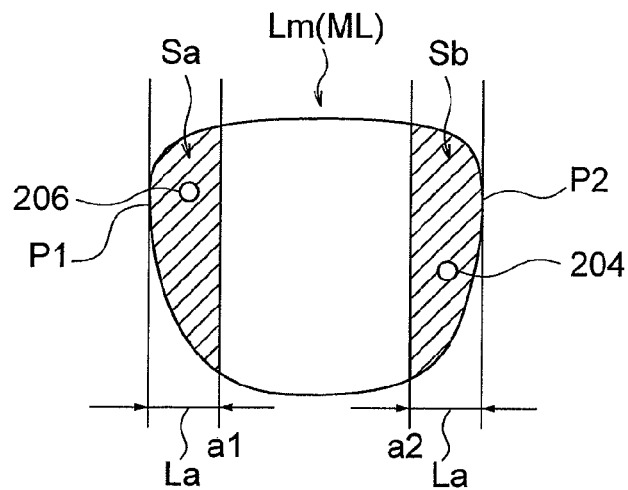
FIG. 24A is an explanatory view illustrating an example of a position detecting area of a mounting hole of a lens.
Figure 24B:
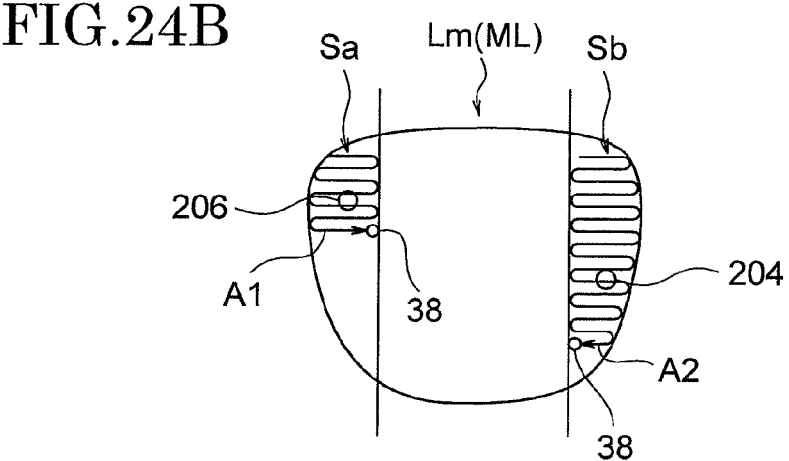
FIG. 24B is a function explanatory view of the position detection of the mounting hole.
Figure 24C:
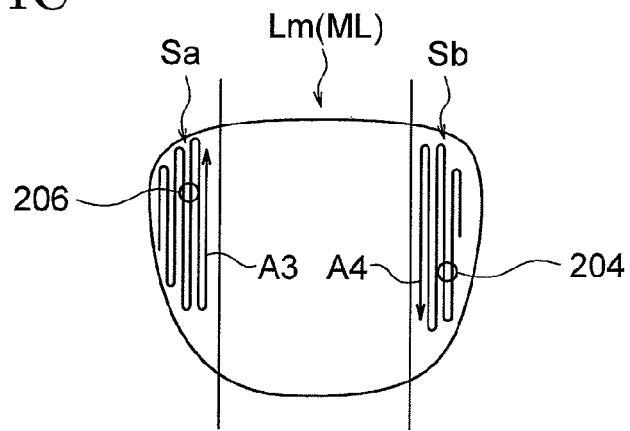
FIG. 24C is a function explanatory view of the position detection of the mounting hole.
Figure 24D:
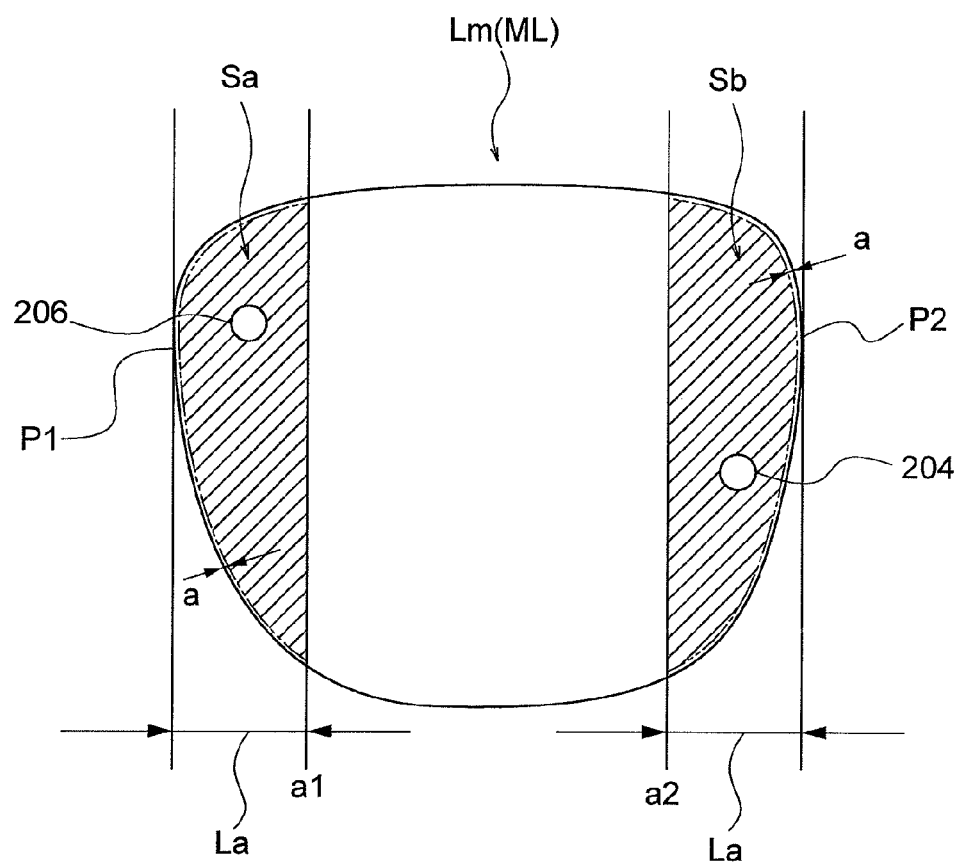
FIG. 24D is an explanatory view illustrating in detail the position detecting area of the mounting hole in FIG. 24A.

After that, the arithmetic control circuit 52 scans (moves) in a zigzag the lens measuring element for a mounting hole 38, which has contact with the back side refracting surface, in the mounting hole detection areas Sa, Sb as illustrated by arrows A1, A2 in FIG. 24B according to the three-dimensional shape information of the lens ($\theta i$, $\rho i$, Zbi), and senses the mounting holes 206, 204. In the example illustrated in FIG. 24A, the measuring element for a mounting hole 38 is moved in a zigzag from an upper portion to a lower portion of the lens Lm. As illustrated by arrows A3, A4 in FIG. 24C, the measuring element for a mounting hole 38 may be moved in a zigzag in the right and left direction of the lens Lm.

Such movement of the measuring element for a mounting hole 38 in the horizontal direction is performed by controlling the driving of the driving motor 6 and the driving of a pulse motor (not shown) which moves the not shown entire base in FIG. 2 with the arithmetic control circuit 52. The displaced position of the measuring element for a mounting hole 38 in the horizontal direction is obtained as the rotational angle $\theta i$ of the rotation base 9 by the driving motor 6 and the positional information ($\theta i$, $\rho i'$) of the right and left displacement of the above-described pulse motor. The displaced position of the measuring element for a mounting hole 38 in the vertical direction is obtained as $Zi'$ from the detection signal of the linear scale 40 corresponding to the positional information ($\theta i$, $\rho i'$). Accordingly, when moving the measuring element for a mounting hole 38 in zigzag as described above, the three-dimensional position information of the measuring element for a mounting hole 38 is obtained as ($\theta i$, $\rho i'$, $Zi'$).

Figure 25A:
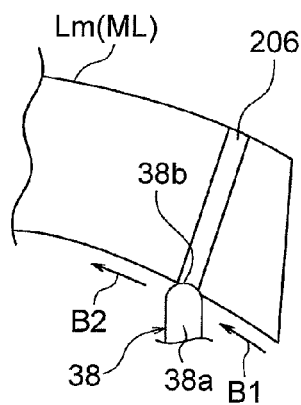
FIG. 25A is a partial cross-sectional view describing the detection of the mounting hole provided in the lens.
Figure 25B:
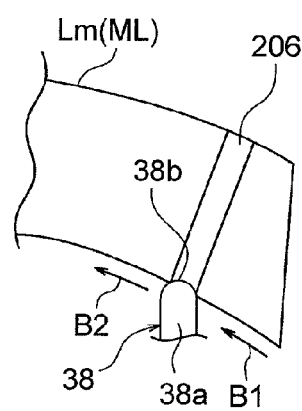
FIG. 25B is a partial cross-sectional view describing the detection of the mounting hole provided in the lens.
Figure 25C:
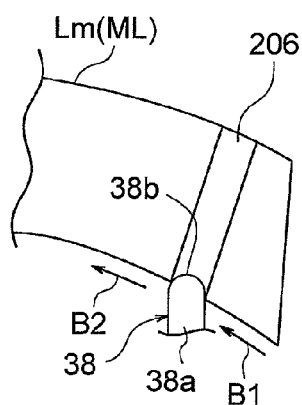
FIG. 25C is a partial cross-sectional view describing the detection of the mounting hole provided in the lens.
Figure 25D:
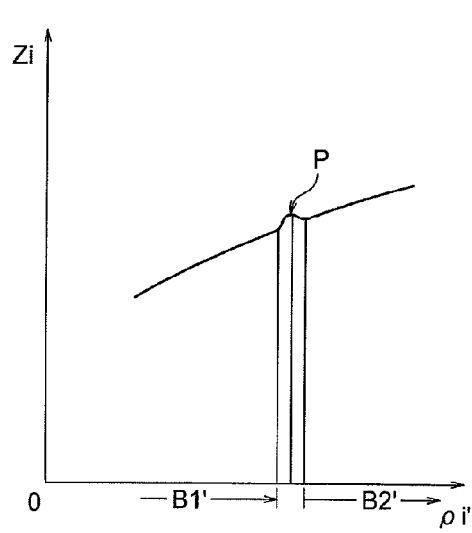
FIG. 25D is an explanatory view describing the detection of the mounting hole of FIGS. 25A to 25C.

In a case that the measuring element for a mounting hole 38 is moved in zigzag as described above, if the measuring element for a mounting hole 38 is moved in the direction illustrated by arrows B1, B2 in FIGS. 25A to 25C, for example, the measuring element for a mounting hole 38 smoothly moves upward along the back side refracting surface of the lens Lm around passing the mounting hole 206. The position Zi of which the measuring element for a mounting hole 38 is displaced upward is obtained as a vertical position change curve as illustrated in FIG. 25D from the detection signal of the linear scale 40. In the vertical position change curve, in a position where the measuring element for a mounting hole 38 moves toward the mounting hole 206 as illustrated by the arrow B1 in FIGS. 25A to 25C, the movement position $Zi'$ smoothly changes upward as illustrated by the arrow B1', in a position where the measuring element for a mounting hole 38 moves toward the mounting hole 206 as illustrated by the arrow B2 in FIGS. 25A-25C, the movement position $Zi'$ smoothly changes upward as illustrated by the arrow B2'

If a part of the measuring element for a mounting hole 38 enters into the mounting hole 206, the displacement of the measuring element for a mounting hole 38 in the upward direction significantly changes in a position illustrated in P as the vertical position change curve in FIG. 25D.

Thus, the arithmetic control circuit 52 stores the central position of the position P as the three-dimensional position information ($\theta i$, $\rho i'$, $Zi'$) of the mounting hole 206 in the memory 55 to be mounting hole position processing data (data for opening a hole).

In addition, the mounting holes 204, 205, 207 are similarly measured.

MODIFIED EXAMPLE 1

The above embodiment has a structure such that the bridge 201, as illustrated in FIG. 23B, has the fixing plate portions 201c, 201d which have contact with the back side refracting surfaces of the lenses Lm (ML), Lm (MR), and the attachment for a temple 202, as illustrated in FIG. 23B, has the fixing plate portion 202b which has contact with the back side refracting surfaces of the lenses Lm (ML), Lm (MR). However, the structure is not limited to the above embodiment.

Figure 26A:
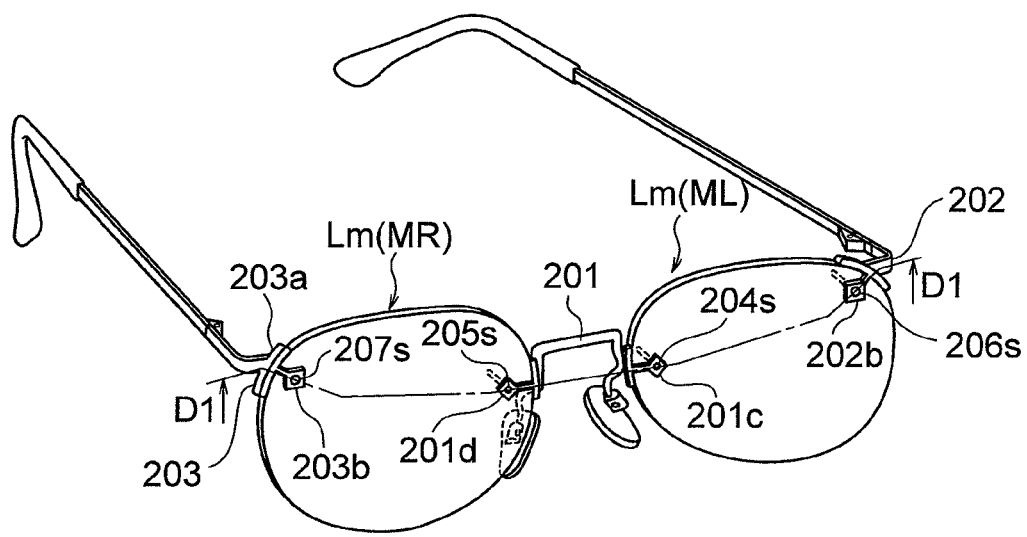
FIG. 26A is a perspective view illustrating another example of two-point frame eyeglasses.
Figure 26B:
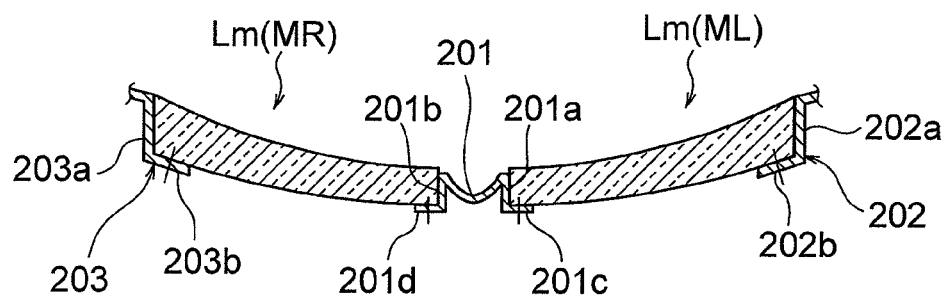
FIG. 26B is a cross-sectional view along a line D1-D1 in FIG. 26A.

For example, Modified Example 1 may have a structure such that the bridge 201, as illustrated in FIGS. 26A and 26B, has the fixing plate portions 201c, 201d which have contact with front side refracting surfaces of the lenses Lm (ML), Lm (MR), and the attachment for a temple 202, as illustrated in FIG. 23B, has the fixing plate portions 202b, 203b which have contact with the front side refracting surfaces of the lenses Lm (ML), Lm (MR).

In this case, the curvature of the front side refracting surface and the circumferential length of the edge face of the lenses Lm (ML), Lm (MR) are measured in the same manner as the back side refracting surface of the lens Lm as described above, and positions of the mounting holes 204-207 are measured.

In FIGS. 26A and 26B, portions which are the same or approximately the same portions in FIGS. 23A and 23B are denoted by the numerals used in the FIGS. 23A and 23B, and will not be explained.

MODIFIED EXAMPLE 2

Figure 27:
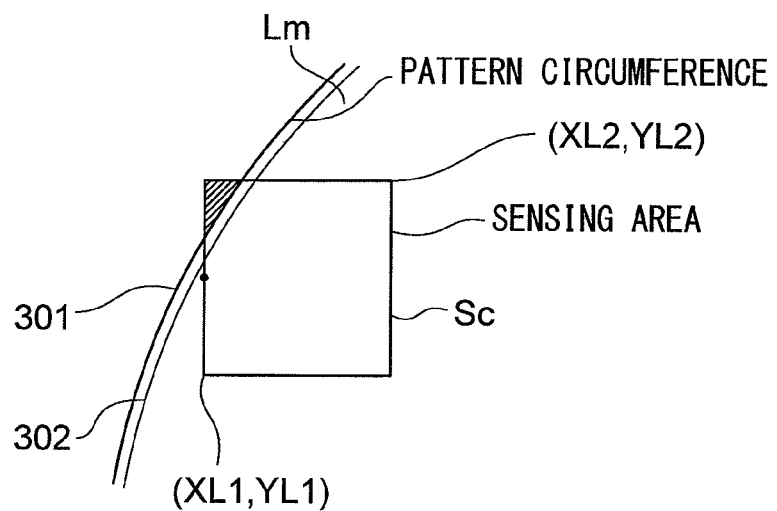
FIG. 27 is an explanatory view illustrating another example of the position detection area of the mounting hole of the lens.

In the above embodiment, the mounting hole detection areas (sensing areas) Sa, Sb which extend vertically in the right and left portions of the lens Lm are set; however, the mounting hole detection areas are not limited to the above embodiment. For example, as illustrated in FIG. 27, based on the lens shape information ($\theta i$, $\rho i$, Zbi), an allowance line 302 for the measurement is set in a position which is inside by a predetermined amount (for example, 1 mm inside) from an outer circumferential surface 301 of the lens Lm, and a mounting hole detection area Sc of a predetermined area (for example, 10 mm×10 mm) is set beforehand.

Figure 28:
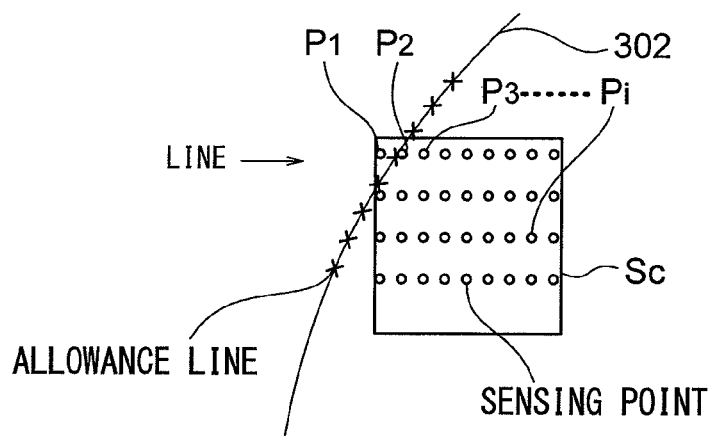
FIG. 28 is an explanatory view illustrating an example of a position of the position detection in the position detection area of the mounting hole of the lens in FIG. 27.

As illustrated in FIG. 28, a number of measurement points pi (for example, 200 measurement points in a vertical and horizontal arrangement) are set in the mounting hole search area Sc described above, and the three-dimensional position information of the refracting surface of the lens Lm in the 200 measurement points Pi of the vertical and horizontal arrangement (line-column) is measured by the measuring element for a mounting hole 38. A position of the mounting hole is obtained from a place obtained from the detection signal of the linear sensor 40, where the measuring element for a mounting hole 38 is greatly displaced upward in the mounting hole search area Sc. The obtained position is stored as the three-dimensional position information ($\theta i$, $\rho i'$, $Zi'$) of the mounting hole in the memory 55, and is taken as mounting hole processing data (data for opening a hole).

As typical examples, positions where the mounting holes 204 to 207 and the like are formed to the shape of the lens Lm are positions which are closer to an upper side of right and left end portions of the lens Lm, or positions which are closer to the center portion in the vertical direction of the right and left end portions of the lens Lm. Accordingly, it is preferable to provide a switch for selecting a detection position (mounting hole detection area) in right and left upper end portions, a center portion in the vertical direction or the like of the lens Lm, and it is preferable to set the mounting hole detection area (sensing area) Sc based on the selected detection position by this switch and the lens shape information (θi, ρi, Zbi) of the lens.

Figure 28A:
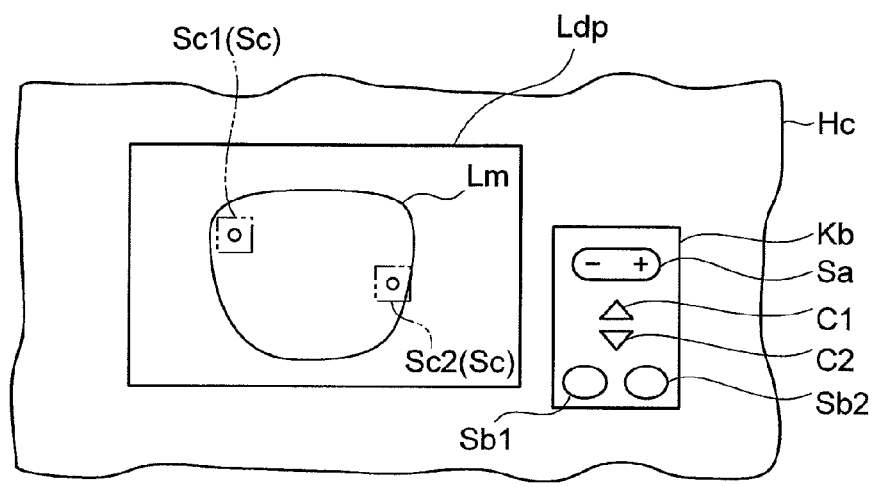
FIG. 28A is an explanatory view illustrating a relationship between a liquid crystal display and a key board for selecting the detection area of the mounting hole of the lens in FIG. 28.
Figure 28B:
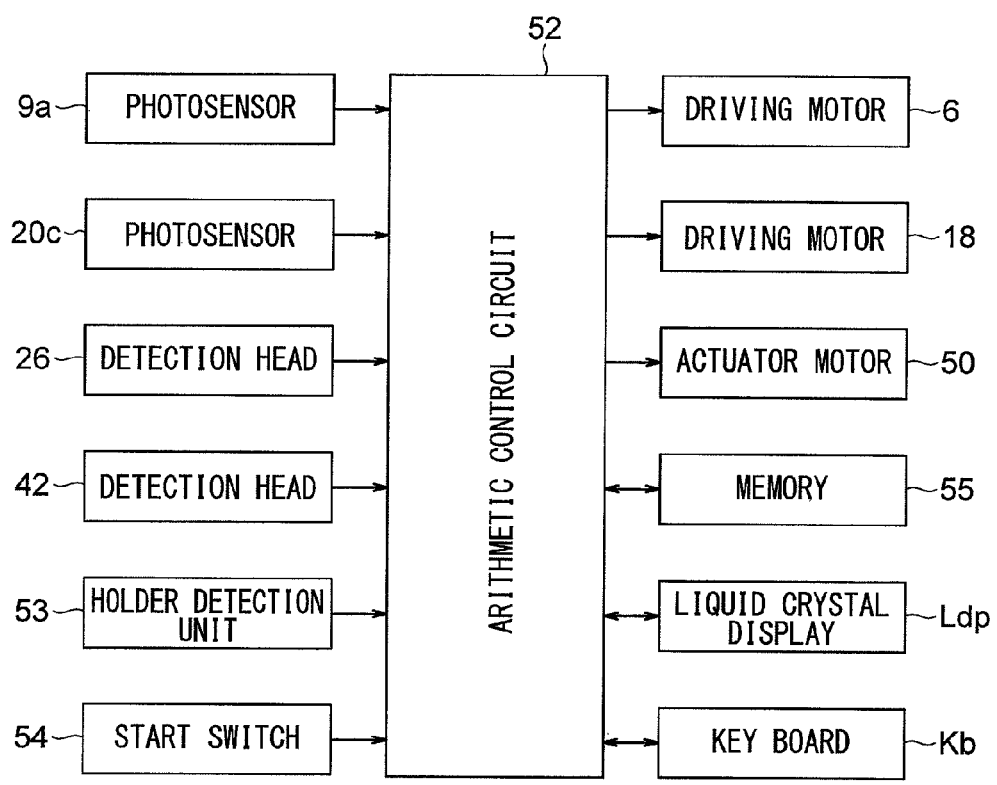
FIG. 28B is a control circuit diagram in FIG. 28A.

Namely, the mounting hole detection area (sensing area) Sc can be set as follows. For example, the lower portion, the side face and a part of the upper portion of the device main body 1 in FIG. 1 are covered by a main body case Hc illustrated in FIG. 28A. The liquid crystal display Ldp is set in the main body case Hc as a display, and the shape of the lens Lm is displayed on the liquid crystal display Ldp, and the mounting hole detection areas Sb1, Sb2 (Sc) are displayed on the right and left upper end portion or the central portion in the vertical direction of the lens Lm. These are displayed by the arithmetic control circuit 52 in FIG. 28B according to the lens shape information (θi, ρi, Zbi) which is lens shape data.

Moreover, the switches Sa, Sb which select the mounting hole detection areas Sb1, Sb2 are set in the main body case Hc. The arithmetic control circuit 52 selects the mounting hole detection area Sc1 if the switch Sb1 is pressed, and selects the mounting hole detection area Sc2 if the switch Sb2 is pressed.

In addition, instead of setting the switches Sb1, Sb2, a "− +" switch Sa or a "Δ" cursor key c1 and a "▼" cursor key c2 is provided in the key board Kb, and the arithmetic control circuit 52 can set to select the mounting hole detection areas Sc1, Sc2 upon the operation of the "− +" switch Sa or a "Δ" cursor key c1 and a "▼" cursor key c2.

MODIFIED EXAMPLE 3

Figure 29:
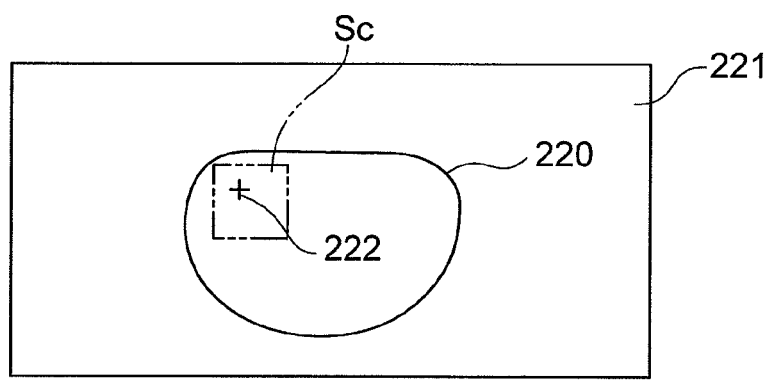
FIG. 29 is an explanatory view of the liquid crystal display for setting the position detection area of the mounting hole of the lens.
Figure 29A:
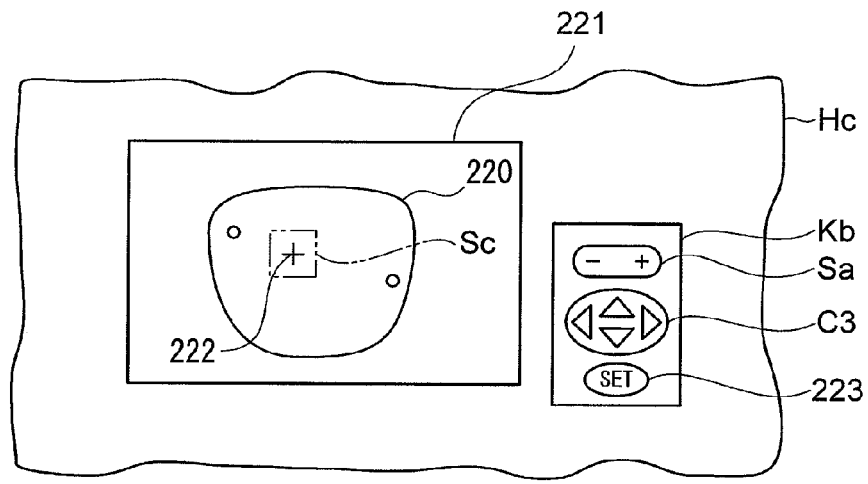
FIG. 29A is an explanatory view illustrating a relationship between the liquid crystal display and the key board for selecting the detection area of the mounting hole of the lens in FIG. 29.

As illustrated in FIGS. 29, 29A, based on the lens shape information (θi, ρi, Zbi), a shape 220 of the lens Lm is displayed on a touch-panel type liquid crystal display 221 and approximate positions of the mounting holes 204-206 and so on are indicated by a cross mark 222, for example, via a touch-panel of the liquid crystal display monitor 221, and the above-described mounting hole detection area (sensing area) Sc can be set based on the indicated position. In this case, the arithmetic control circuit 52 sets the mounting hole detection area (sensing area) Sc centering on the portion indicated by the cross mark 222 according to the lens shape information (θi, ρi, Zbi) of the lens shape data if the setting switch (setting button) 233 is pressed.

Figure 29B:
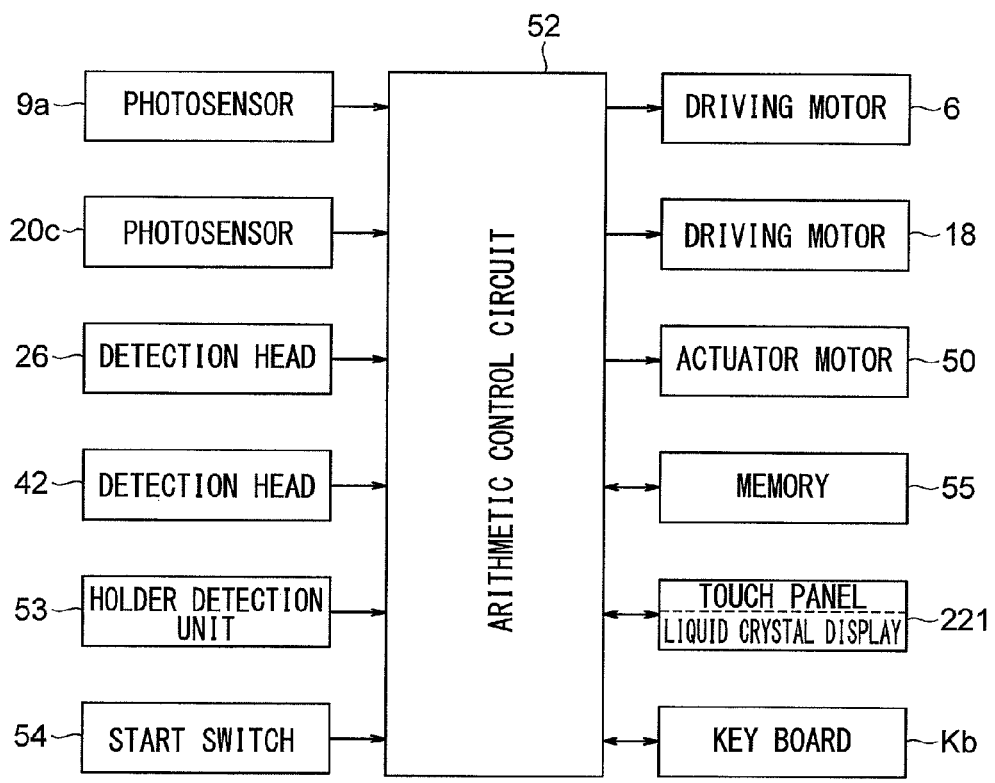
FIG. 29B is a control circuit diagram in FIG. 29A.
Figure 30A:
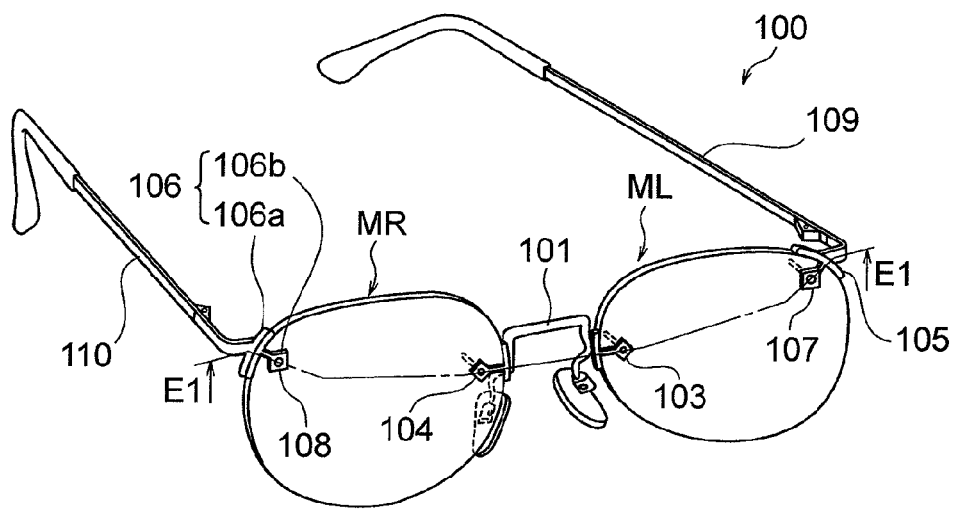
FIG. 30A is a perspective view of a conventional two-point frame eyeglasses
Figure 30B:
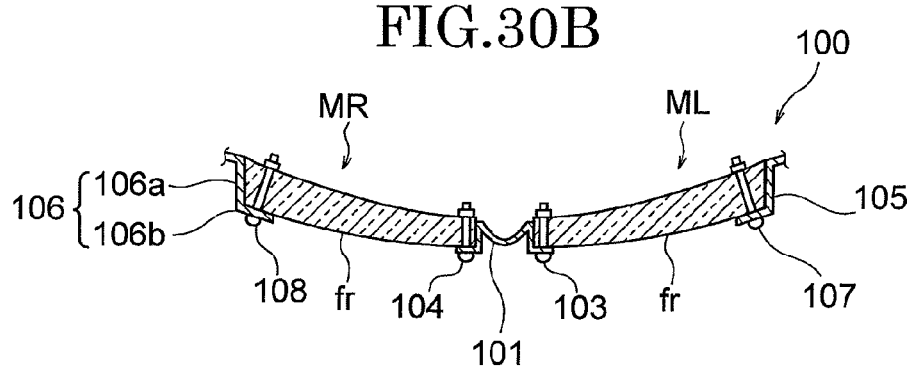
FIG. 30B is a sectional view along an E1-E1 line in FIG. 30A.
Figure 30C:
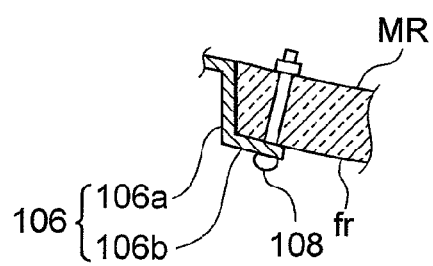
FIG. 30C is a partially enlarged explanatory view of FIG. 30B
Figure 30D:
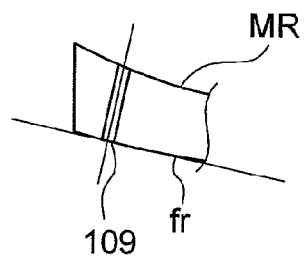
FIG. 30D is an explanatory view illustrating a condition when a fastening screw and an attachment are removed in FIG. 30C.
Figure 30E:
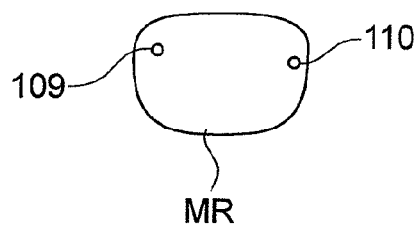
FIG. 30E is an explanatory view of the lens in FIG. 30A.

In addition, as illustrated in FIG. 29A, a cursor operation switch (cursor operation button) c3 is provided in the keyboard Kb of the main body case Hc, and the mounting hole detection area (sensing area) Sc can be specified by the operation of the cursor switch C3. In this case, the arithmetic control circuit 52 illustrated in FIG. 29B controls the movement of the cross mark 222 which is a cursor in the arbitrary direction on the screen of the liquid crystal display 221 by the pressing operation of the up and down and right and left portions of the cursor operation switch c3 in FIG. 29A., and can set the mounting hole detection area (sensing area) Sc centering on the specified portion when the setting switch (setting button) 223 is pressed.

As described above, the lens shape measurement device according to the embodiment of the present invention includes the lens holder (not shown) set in the measuring device main body 1, the measuring element for a lens 36 which measures the rim shape of the lens Lm held in the lens holder (not shown), the measuring element shifter (driving motor 6) which shifts the measuring element for a lens along the outer circumferential face of the lens Lm, the first position detector (linear scale 24) which detects a position along the outer circumferential face of the measuring element 36 for a lens, the second position detector (linear scale 40) which detects a position in the direction orthogonal to the first position detector (linear scale 24), and the arithmetic control circuit 52 which obtains the circumferential face shape data of the lens Lm as three-dimensional information according to the detection signal from the first and second detectors (linear scales 24, 40). By moving the leading end of the measuring element for a lens 36 to have contact with the refracting face of the lens Lm held in the lens holder (not shown), the arithmetic control circuit 52 detects a relationship between the rim shape and the hole position of the lens according to the detection signal from the second position detector (linear scale 40).

According to the above configuration, the position of the mounting hole for mounting the attachment of the two-point frame to the lens can be easily and accurately measured.

The lens shape measurement device according to the embodiment of the present invention is configured to detect by the rim shape of the lens the position of the concave of the lens having the mounting hole for the attachment and the concave on the rim.

According to the above configuration, the concave is formed on the rim of the lens shape, and the attachment of the two-point frame can be attached by using this concave.

In the lens shape measuring device according to the embodiment of the present invention, the measuring element for detecting the mounting hole of the lens for the attachment can be constituted by a member which is different from the measuring element for measuring the rim shape.

According to the above configuration, the measuring element for detecting the mounting hole of the lens for attachment (the measuring element for a mounting hole 38) and the measuring element for a lens 38 can be easily processed.

Moreover, as described above, in the lens shape measuring device according to the embodiment of the present invention, the arithmetic control circuit 52 sets the mounting hole detection area (Sa, Sb, Sc and the like) in a position which is inside by a predetermined amount from the outer circumferential face of the lens Lm according to the lens shape data. According to this configuration, the measuring element for a mounting hole 38 is prevented from being deviated from the lens Lm upon detecting the mounting holes 204, 206 by moving the measuring element for a mounting hole 38 in the mounting hole detection area Sa, Sb, Sc.

In the lens shape measuring device according to the embodiment of the present invention, the arithmetic control circuit 52 sets the mounting hole detection area (Sa, Sb) in the right and left portions of the lens Lm according to the lens shape data. According to this configuration, the mounting hole detection area (Sa, Sb) is narrowed, so that the detection time can be reduced.

In the lens shape measuring device according to the embodiment of the present invention, the arithmetic control circuit 52 sets the mounting hole detection areas (Sc) on the right and left end portions of the upper side of the lens Lm according to the lens shape data. According to this configuration, the detection time can be reduced compared to a case when the mounting hole detection areas are set in the entire of the right and left portions.

In the lens shape measuring device according to the embodiment of the present invention, the arithmetic control circuit 52 sets the mounting hole detection area (Sc) in the central portions of the right and left end portions of the lens in the vertical direction according to the lens shape data. According to this configuration, the detection time can be reduced compared to a case when the mounting hole detection areas are set in the entire of the right and left portions.

The lens shape measuring device according to the embodiment of the present invention includes a detection area selector (switch Sb1, Sb2, "− +" switch Sa, or "▲" cursor key c1 and "▼" cursor key c2) which selects the right and left end portions of the upper side of the lens Lm or the central portion of the right and left end portions of the lens Lm in the vertical direction as the mounting hole detection area (Sc), and the arithmetic control circuit 52 sets the right and left end portions of the upper side of the lens or the central portion of the right and left end portions of the lens in the vertical direction as the mounting hole detection area (Sc) by the selection operation of the detection area selection device (switch Sb1, Sb2, "− +" switch Sa or "▲" cursor key c1 and "▼" cursor key c2). According to this configuration, a plurality of mounting hole detection areas can be simply selected and set.

The lens shape measuring device according to the embodiment of the present invention includes the liquid crystal display which displays the shape of the lens Lm and the detection area input device (touch panel, cursor operation switch c3 and the like) which inputs the mounting hole detection area in the lens Lm displayed on the liquid crystal display, and the arithmetic control circuit 52 sets the mounting hole detection area according to the input of the detection area input device. According to the above configuration, the mounting hole detection area can be selected corresponding to the mounting hole, so that it can correspond to a lens in which the position of the mounting hole is not standard.

In the lens shape measuring device according to the embodiment of the present invention, the detection area input device is a touch panel provided in the liquid crystal display, and the arithmetic control circuit 52 displays a mark (cross mark 222) illustrating the center of the detection area on the liquid crystal display, and sets the mounting hole detection area centering on the mark (cross mark 222) of the center of the detection area on the touched portion of the touch panel. According to this configuration, the mounting hole detection area can be selected corresponding to the mounting hole without providing a switch and the like for selecting, so that it can correspond to a lens in which the position of the mounting hole is not standard.

The invention claimed is:

1. A lens shape measurement device, comprising:
    a lens holder set in a measuring element main body;
    a measuring element for a lens configured to measure a rim shape of a lens, the measuring element for a lens including a leading end portion engageable with a mounting hole of the lens for an attachment, which is held in the lens holder, and a side face which has contact with a circumferential face of the lens to be moved therealong;
    a measurement element shifter configured to displace the measuring element for a lens along an outer circumferential face of the lens;
    a first position detector configured to detect a position of the measuring element for a lens along the outer circumferential face;
    a second position detector configured to detect a position in the direction orthogonal to the first position detector; and
    an arithmetic control circuit configured to obtain a relationship between the rim shape and a position of the mounting hole based on a detection signal from the second position detector by controlling the measuring element shifter to move the leading end of the measuring element for a lens to have contact with an refracting face of the lens held in the lens holder.

2. The lens shape measurement device according to claim 1, wherein a position of a concave of the lens including the mounting hole for the attachment and the concave on the rim is detected by the rim shape of the lens.

3. The lens shape measurement device according to claim 1, wherein the measuring element which detects the mounting hole of the lens for the attachment is constituted by a member different from the measuring element for measuring the rim shape.

4. The lens shape measurement device according to claim 1, wherein the arithmetic control circuit sets a mounting hole detection area in a position which is inside by a predetermined amount from the outer circumferential face of the lens according to the lens shape data.

5. The lens shape measurement device according to claim 4, wherein the arithmetic control circuit sets the mounting hole detection area in right and left portions of the lens according to the lens shape data.

6. The lens shape measurement device according to claim 5, wherein the arithmetic control circuit sets the mounting hole detection area in right and left end portions of an upper side of the lens according to the lens shape data.

7. The lens shape measurement device according to claim 5, wherein the arithmetic control circuit sets the mounting hole detection area in a central portion of right and left end portions of the lens in the vertical direction according to the lens shape data.

8. The lens shape measurement device according to claim 4, further comprising:
    a detection area selection device configured to select right and left end portions of an upper side of the lens or a central portion of the right end left end portions of the lens in the vertical direction as the mounting hole detection area, wherein
    the arithmetic control circuit sets the right and left end portion of the upper side of the lens or the central portion of the right and left end portions of the lens by an selection operation of the detection area selection device.

9. The lens shape measurement device according to claim 1, further comprising:
    a liquid crystal display configured to display a shape of the lens; and
    a detection area input device configured to input a mounting hole detection area into a lens displayed on the liquid crystal display, wherein
    the arithmetic control circuit sets the mounting hole detection area according to the input of the detection area input device.

10. The lens shape measurement device according to claim 9, wherein
    the detection area input device is a touch panel arranged in the liquid crystal display, and
    the arithmetic control circuit displays a mark of a center of the mounting hole detection area on a touched portion of the touch panel and sets the mounting hole detection area centering on the mark.

* * * * *